United States Patent
Yamakawa et al.

(10) Patent No.: US 9,036,269 B2
(45) Date of Patent: May 19, 2015

(54) IMAGING LENS AND IMAGING APPARATUS

(71) Applicant: FUJIFILM Corporation, Tokyo (JP)

(72) Inventors: Hiromitsu Yamakawa, Saitama-ken (JP); Toru Ito, Saitama-ken (JP); Toshiaki Katsuma, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/109,110

(22) Filed: Dec. 17, 2013

(65) Prior Publication Data
US 2014/0104702 A1     Apr. 17, 2014

Related U.S. Application Data

(63) Continuation of application No. PCT/JP2012/003983, filed on Jun. 19, 2012.

(30) Foreign Application Priority Data

Jun. 22, 2011   (JP) ................................ 2011-137937

(51) Int. Cl.
| G02B 13/18 | (2006.01) |
| G02B 13/00 | (2006.01) |
| G02B 9/60  | (2006.01) |
| G02B 13/06 | (2006.01) |

(52) U.S. Cl.
CPC ............ *G02B 13/18* (2013.01); *G02B 13/0045* (2013.01); *G02B 9/60* (2013.01); *G02B 13/06* (2013.01)

(58) Field of Classification Search
CPC .... G02B 13/18; G02B 13/06; G02B 13/0045; G02B 9/60
USPC .................................................. 359/714, 770
See application file for complete search history.

(56) References Cited

U.S. PATENT DOCUMENTS

| 7,684,127 B2 | 3/2010 | Asami |
| 8,116,013 B2 | 2/2012 | Yoshida et al. |

(Continued)

FOREIGN PATENT DOCUMENTS

| JP | 7253540 | 10/1995 |
| JP | 2009-031762 | 2/2009 |

(Continued)

OTHER PUBLICATIONS

NPL English Translation of International Preliminary Report on Patentability (CH I) prepared for PCT/JP2012/003983 on Dec. 23, 2013.*

(Continued)

*Primary Examiner* — David N Spector
(74) *Attorney, Agent, or Firm* — Young & Thompson

(57) ABSTRACT

An imaging lens substantially consists of five lenses of a first lens having a meniscus shape with its convex surface facing an object side and negative refractive power, a second lens having negative refractive power, and the image-side surface of which has a convex shape facing an image side in the vicinity of an optical axis, a third lens having positive refractive power, a stop, a fourth lens having positive refractive power, and a fifth lens having negative refractive power. At least one of the surfaces of the first lens through the fifth lens is aspherical. A predetermined conditional formula about a distance on the optical axis from an object-side surface of the first lens to an image plane and a distance on the optical axis from the object-side surface of the first lens to the image-side surface of the second lens is satisfied.

19 Claims, 17 Drawing Sheets

EXAMPLE 1

(56) References Cited

U.S. PATENT DOCUMENTS

| | | |
|---|---|---|
| 8,254,040 B2 | 8/2012 | Peng et al. |
| 2009/0009888 A1 | 1/2009 | Asami |
| 2010/0188757 A1 | 7/2010 | Saitoh |
| 2010/0254025 A1 | 10/2010 | Yoshida et al. |
| 2011/0102541 A1 | 5/2011 | Jin et al. |
| 2011/0122512 A1 | 5/2011 | Asami |
| 2012/0099211 A1 | 4/2012 | Peng et al. |

FOREIGN PATENT DOCUMENTS

| | | |
|---|---|---|
| JP | 2009-063877 | 3/2009 |
| JP | 2009-145809 | 7/2009 |
| JP | 2009-216956 | 9/2009 |
| JP | 2010-014855 | 1/2010 |
| JP | 2010-243711 | 10/2010 |
| JP | 2011-107593 | 6/2011 |
| JP | 2012-088702 | 5/2012 |
| WO | WO 2010/001713 | 1/2010 |
| WO | WO 2010/024214 | 3/2010 |

OTHER PUBLICATIONS

International Search Report, PCT/JP2012/003983, Oct. 16, 2012.
Extended European search report, dated Oct. 13, 2014, in corresponding European Patent Application No. 12802293.6.

\* cited by examiner

EXAMPLE 1

EXAMPLE 2

EXAMPLE 3

EXAMPLE 4

EXAMPLE 5

EXAMPLE 6

EXAMPLE 7

EXAMPLE 8

IMAGING LENS AND IMAGING APPARATUS

CROSS REFERENCE TO RELATED APPLICATIONS

This application is a continuation of PCT/JP2012/003983 filed on Jun. 19, 2012, which claims priority to Japanese Application No. 2011-137937 filed on Jun. 22, 2011. The entire contents of each of the above applications are hereby incorporated by reference.

BACKGROUND OF THE INVENTION

1. Field of the Invention

The present invention relates to an imaging lens and an imaging apparatus. In particular, the present invention relates to a wide-angle imaging lens appropriate for use in an in-vehicle camera, a surveillance camera, or the like using an imaging device, such as a CCD (Charge Coupled Device) and a CMOS (Complementary Metal Oxide Semiconductor). Further, the present invention relates to an imaging apparatus including the imaging lens.

2. Description of the Related Art

In recent years, the size of an imaging device, such as a CCD and a CMOS, became very small, and the resolution of the imaging device became very high. Therefore, the size and the weight of the body of imaging equipment and an imaging lens mounted on the imaging equipment also need to be reduced. Meanwhile, an imaging lens used in an in-vehicle camera, a surveillance camera or the like needs to have high weather-resistance characteristics and high optical performance with a wide angle of view so that an excellent view is secured for a wide range.

Imaging lenses in the aforementioned fields are disclosed, for example, in U.S. Pat. No. 7,684,127 (Patent Document 1), Japanese Unexamined Patent Publication No. 2009-216956 (Patent Document 2), and U.S. Patent Application Publication No. 20110102541 (Patent Document 3). Patent Documents 1 through 3 disclose imaging lenses, each consisting of five lenses including an aspherical lens.

SUMMARY OF THE INVENTION

In recent years, a need for a wider angle of view is increasing in the fields of an in-vehicle camera, a surveillance camera and the like. For example, a full angle of view exceeding 180 degrees is needed. Further, as the size of an imaging device became smaller and the resolution of the imaging device became higher in recent years, an imaging lens having high resolution and high optical performance in which an excellent image is obtainable in a wide range of an image formation area is needed. Further, a faster lens is needed. However, in conventional lens systems, it has been difficult to achieve a wide angle of view and high optical performance to satisfy the need of recent years while structuring the lens systems at low cost and in small size.

The lens disclosed in Patent Document 1 has an F-number of 2.0, and the lens is a relatively fast lens. However, a full angle of view is less than 163 degrees. Therefore, the performance of the lens is insufficient when the lens is applied to an imaging lens with a full angle of view exceeding 180 degrees.

The lenses disclosed in Patent Documents 2 and 3 are wide-angle lenses with full angles of view of 190 degrees or greater. However, F-number is 2.8. Therefore, performance deteriorates if F-number is reduced to 2.0 to obtain a faster lens, or if a full angle of view is increased to exceed about 210 degrees.

In view of the foregoing circumstances, it is an object of the present invention to provide an imaging lens that can achieve a wider angle of view and high performance while making the imaging lens in small size and at low cost. Further, it is another object of the present invention to provide an imaging apparatus including the imaging lens.

A first imaging lens of the present invention is an imaging lens substantially consisting of five lenses of:

a first lens having a meniscus shape with its convex surface facing an object side and negative refractive power;

a second lens having negative refractive power, and the image-side surface of which has a convex shape facing an image side in the vicinity of an optical axis;

a third lens having positive refractive power;

a stop;

a fourth lens having positive refractive power; and a fifth lens having negative refractive power, which are in this order from the object side, wherein at least one of the surfaces of the first lens through the fifth lens is aspherical, and wherein the following conditional formula (2-1) is satisfied:

$$0.11 < d1\text{-}4/L \quad (2\text{-}1), \text{where}$$

L: a distance on the optical axis from an object-side surface of the first lens to an image plane (a distance between the fifth lens and the image plane is a distance in air), and d1-4: a distance on the optical axis from the object-side surface of the first lens to the image-side surface of the second lens.

A second imaging according of the present invention is an imaging lens substantially consisting of five lenses of:

a first lens having a meniscus shape with its convex surface facing an object side and negative refractive power;

a second lens having negative refractive power;

a third lens having positive refractive power;

a stop;

a fourth lens having positive refractive power; and a fifth lens having negative refractive power, which are in this order from the object side, wherein at least one of the surfaces of the first lens through the fifth lens is aspherical, and wherein the following conditional formula (2-2) is satisfied:

$$0.40 < d1\text{-}4/L \quad (2\text{-}2), \text{where}$$

L: a distance on the optical axis from an object-side surface of the first lens to an image plane (a distance between the fifth lens and the image plane is a distance in air), and d1-4: a distance on the optical axis from the object-side surface of the first lens to the image-side surface of the second lens.

The expression about the first lens "having a meniscus shape with its convex surface facing an object side and negative refractive power" is considered in a paraxial region when the first lens includes an aspherical surface.

The expression "substantially consisting of five lenses" means that a lens substantially without power, an optical element, such as a stop and a cover glass, which is not a lens, a mechanism part, such as a lens flange, a lens barrel, an imaging device and a hand shake blur correction mechanism, and the like may be included besides the five lenses.

In the second lens, the third lens, the fourth lens and the fifth lens, when a lens includes an aspherical surface, whether refractive power is positive or negative is considered in a paraxial region unless particularly mentioned.

In the first and second imaging lenses of the present invention, it is desirable that the following conditional formulas (1) through (13) are satisfied. In a desirable mode, the imaging lens of the present invention may include structure of one of the following conditional formulas (1) through (13). Alternatively, the imaging lens of the present invention may include structure of arbitrary two or more of them in combination:

$$0.10 < f34/L < 0.17 \quad (1);$$

$$0.40 < d1\text{-}4/L < 0.50 \quad (2);$$

$$0.45 < d3\text{-}11/L < 0.54 \quad (3);$$

$$0.02 < d4\text{-}5/L < 0.05 \quad (4);$$

$$0.012 < d6\text{-}8/L < 0.04 \quad (5);$$

$$L/r3 < -6.0 \quad (6);$$

$$0.08 < d4\text{-}5/f \quad (7);$$

$$0.04 < d10/f \quad (8);$$

$$0.48 < f3/f \quad (9);$$

$$0.71 < Bf/f \quad (10);$$

$$r10/f < -0.25 \quad (11);$$

$$1.2 < L/f \quad (12); \text{ and}$$

$$(r8+r9)/(r8-r9) < 2.9 \quad (13), \text{ where}$$

f34: a combined paraxial focal length of a third lens and a fourth lens,

L: a distance on an optical axis from an object-side surface of a first lens to an image plane (a distance between a fifth lens and the image plane is a distance in air), d1-4: a distance on an optical axis from an object-side surface of a first lens to an image-side surface of a second lens, d3-11: a distance on an optical axis from an object-side surface of a second lens to an image-side surface of a fifth lens, d4-5: a distance on an optical axis from an image-side surface of a second lens to an object-side surface of a third lens, d6-8: a distance on an optical axis from an image-side surface of a third lens to an object-side surface of a fourth lens, r3: a curvature radius of an object-side surface of a second lens in the vicinity of an optical axis, f: a focal length of an entire system, d10: the thickness of a fifth lens on an optical axis, f3: a focal length of a third lens, Bf: a back focus of an entire system, r10: a curvature radius of an object-side surface of a fifth lens in the vicinity of an optical axis, r8: a curvature radius of an object-side surface of a fourth lens in the vicinity of an optical axis, and r9: a curvature radius of an image-side surface of a fourth lens in the vicinity of an optical axis.

In the first and second imaging lenses of the present invention, it is desirable that the following conditional formulas (7-1) through (13-1) are satisfied. In a desirable mode, the imaging lens of the present invention may include structure of one of the following conditional formulas (7-1) through (13-1). Alternatively, the imaging lens of the present invention may include structure of arbitrary two or more of them in combination:

$$0.20 < d4\text{-}5/f < 0.60 \quad (7\text{-}1);$$

$$0.20 < d10/f < 0.80 \quad (8\text{-}1);$$

$$2.0 < f3/f < 20.0 \quad (9\text{-}1);$$

$$1.5 < Bf/f < 3.0 \quad (10\text{-}1);$$

$$-5.0 < r10/f < -0.50 \quad (11\text{-}1);$$

$$5.0 < L/f < 20.0 \quad (12\text{-}1); \text{ and}$$

$$(r8+r9)/(r8-r9) < 2.0 \quad (13\text{-}1).$$

An imaging apparatus of the present invention includes the aforementioned imaging lens of the present invention.

According to the first and second imaging lenses of the present invention, the shape and the refractive power of each lens is appropriately set in a lens system of at least five lenses. Further, the first and second imaging lenses satisfy conditional formula (2-1) and conditional formula (2-2), respectively. Therefore, it is possible to achieve a sufficiently wide angle of view, a sufficiently large maximum aperture and high optical performance while structuring the lens system at low cost and in small size.

The imaging apparatus of the present invention includes the first or second imaging lens of the present invention. Therefore, the imaging apparatus is structurable at low cost and in small size. Further, imaging at a wide angle of view is possible, and high quality images are obtainable.

DESCRIPTION OF THE PREFERRED EMBODIMENTS

Embodiments of an imaging lens of the present invention will be described in detail with reference to drawings. FIG. 1 through FIG. 8 are cross sections illustrating structural examples of imaging lenses according to embodiments of the present invention. FIG. 1 through FIG. 8 correspond to imaging lenses in Examples 1 through 8, which will be described later, respectively. The basic structure is similar to each other in the examples illustrated in FIG. 1 through FIG. 8, and similar illustration methods are used. Therefore, the imaging lenses according to the first and second embodiments of the present invention will be described mainly with reference to FIG. 1.

First, the structure of the first embodiment of the present invention will be described. The imaging lens according to the first embodiment of the present invention is a lens system composed of five lenses, in which first lens L1, second lens L2, third lens L3, fourth lens L4 and fifth lens L5 are arranged along optical axis Z in this order from an object side. Aperture stop St is arranged between third lens L3 and fourth lens L4. Since aperture stop St is arranged between third lens L3 and fourth lens L4, it is possible reduce the size of the imaging lens in the diameter direction.

Figure 1:
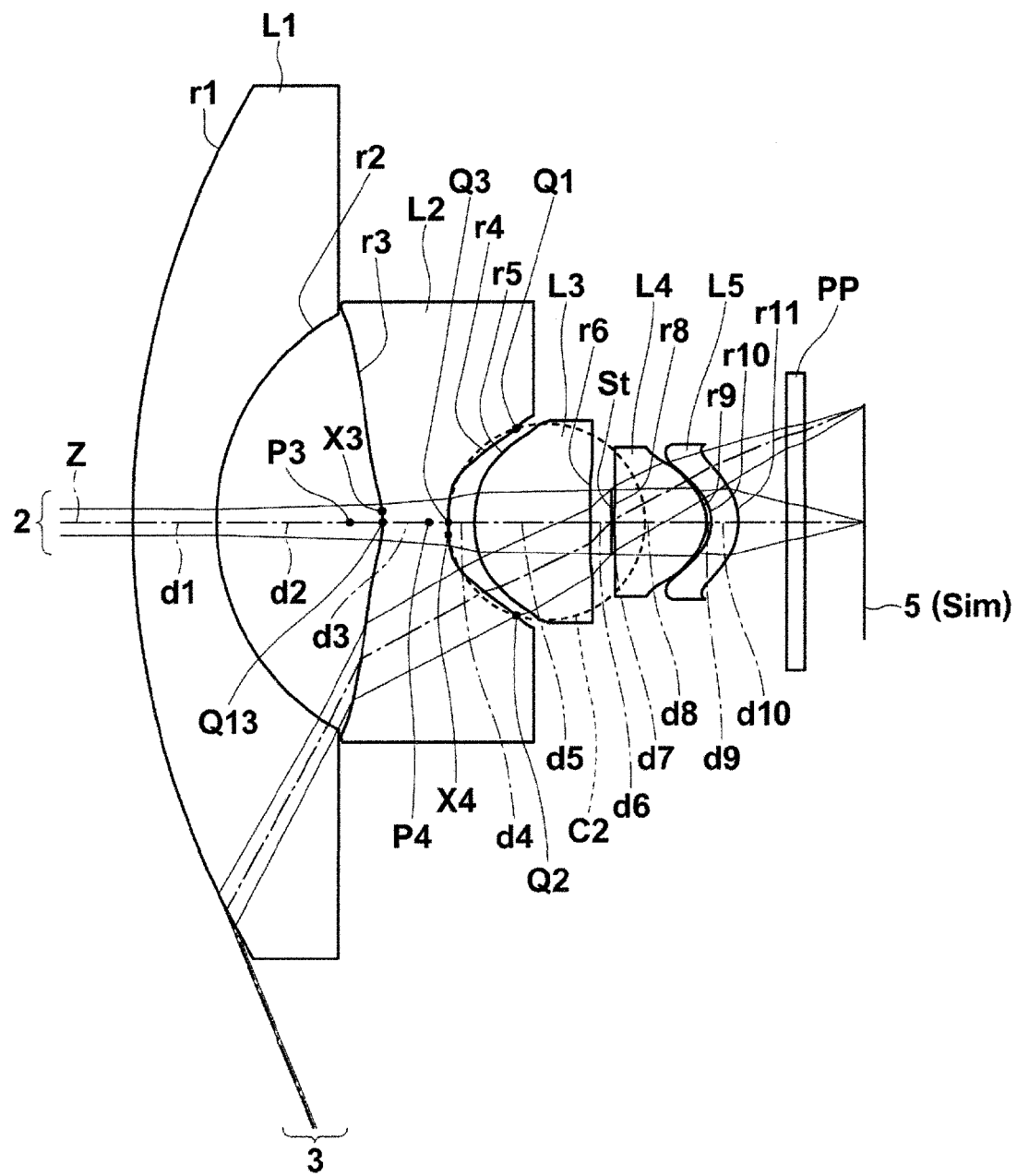
FIG. 1 is a cross section illustrating a lens structure and optical paths of an imaging lens in Example 1 of the present invention.
Figure 2:
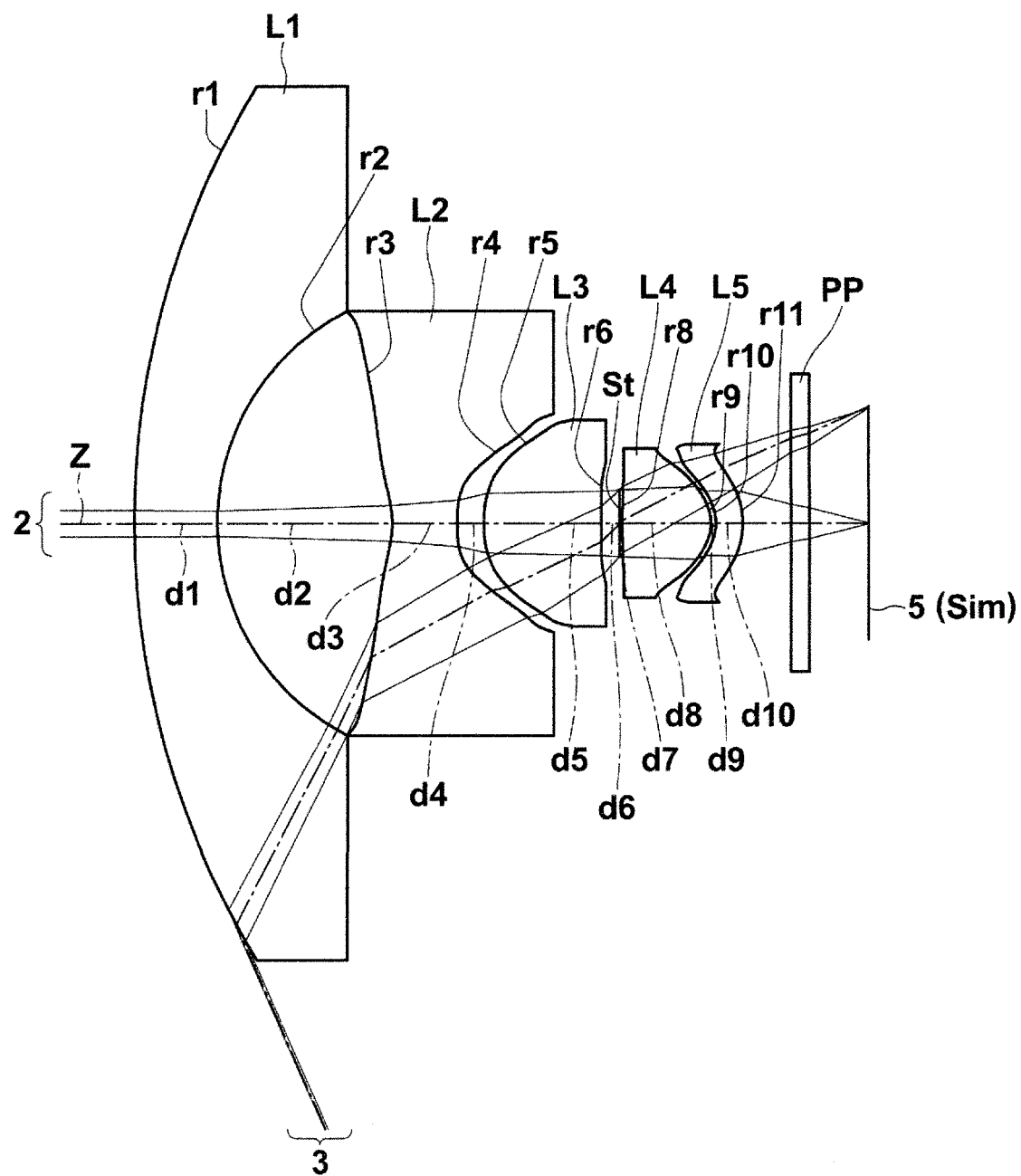
FIG. 2 is a cross section illustrating a lens structure and optical paths of an imaging lens in Example 2 of the present invention.
Figure 3:
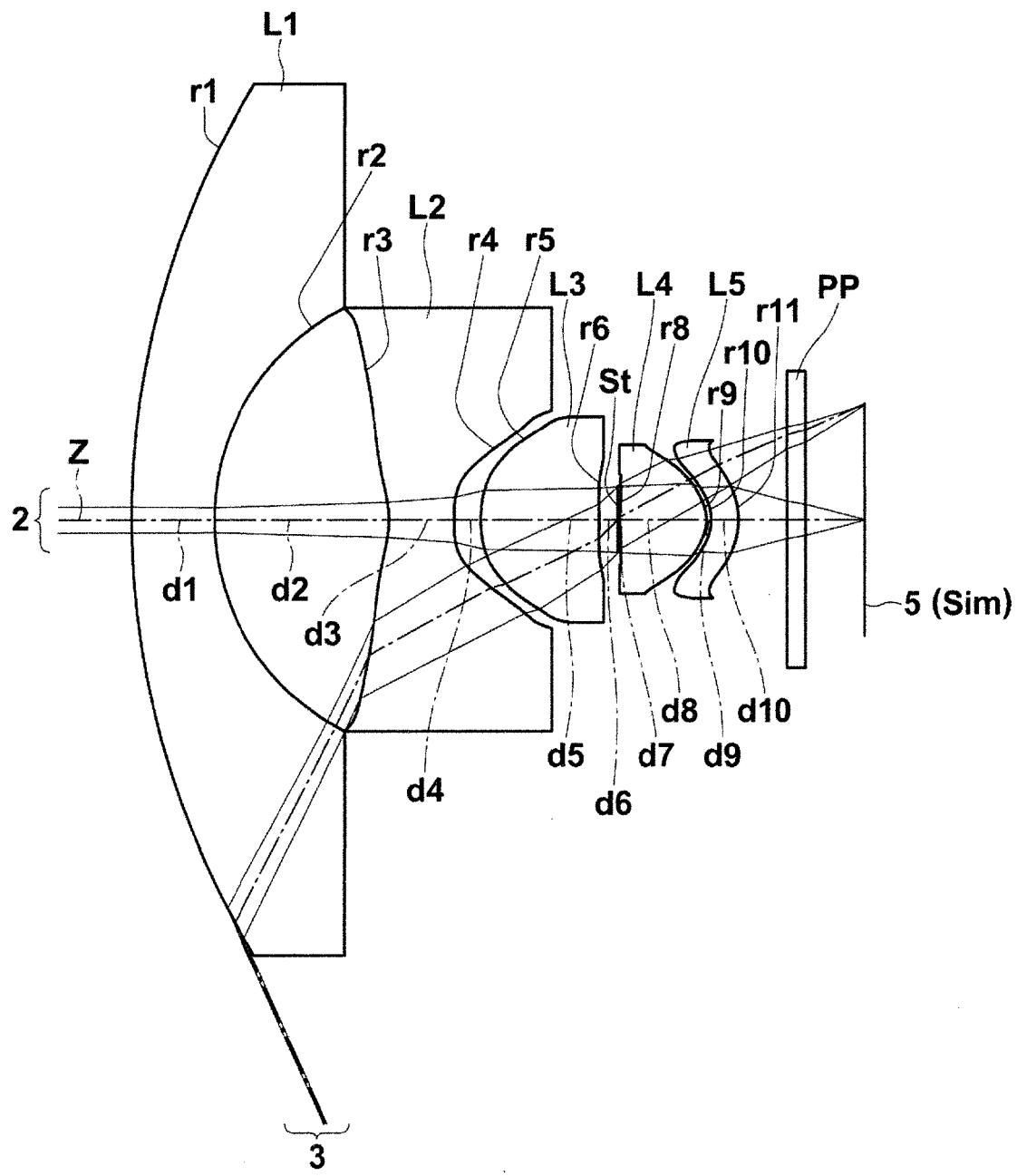
FIG. 3 is a cross section illustrating a lens structure and optical paths of an imaging lens in Example 3 of the present invention.
Figure 4:
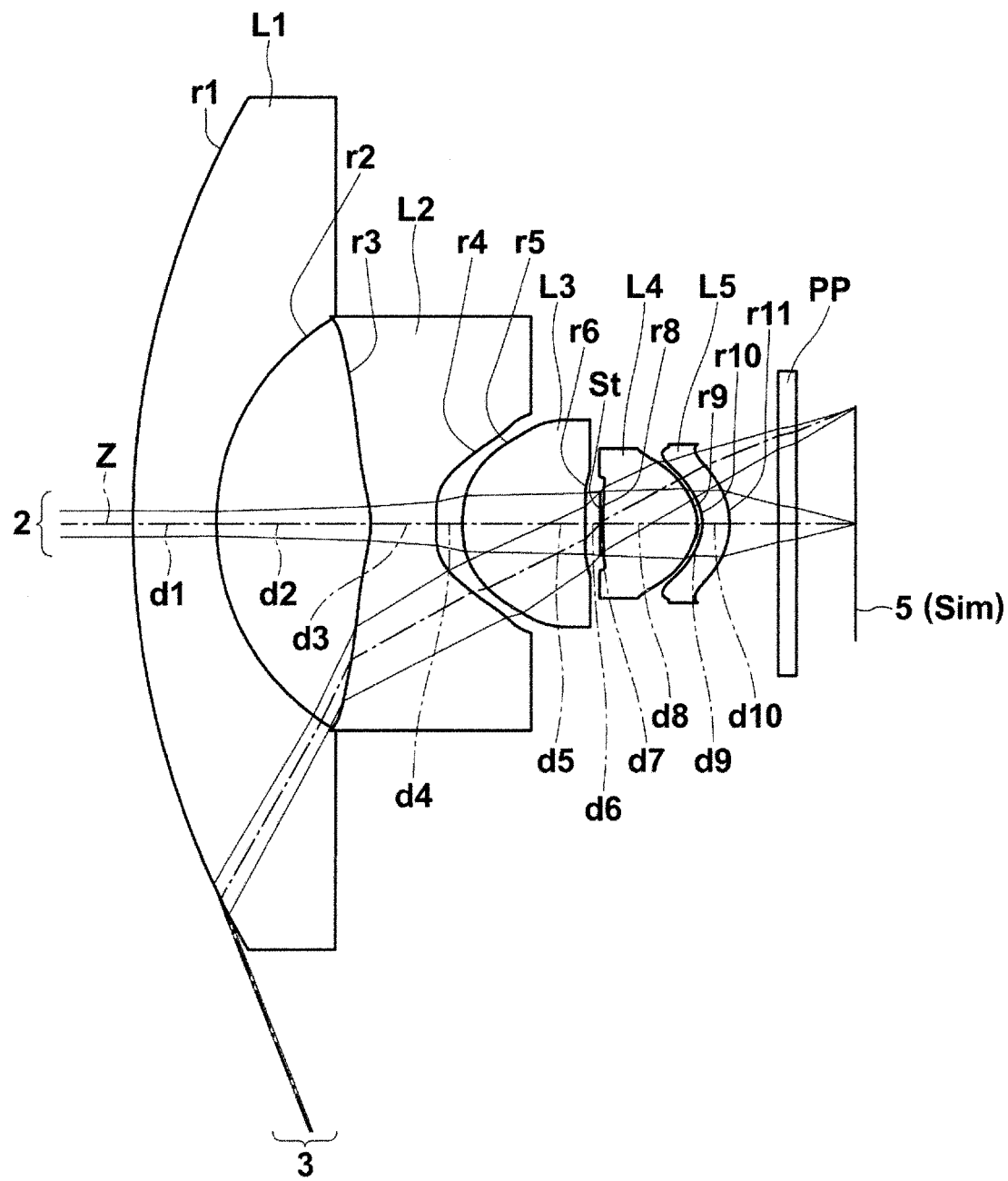
FIG. 4 is a cross section illustrating a lens structure and optical paths of an imaging lens in Example 4 of the present invention.
Figure 5:
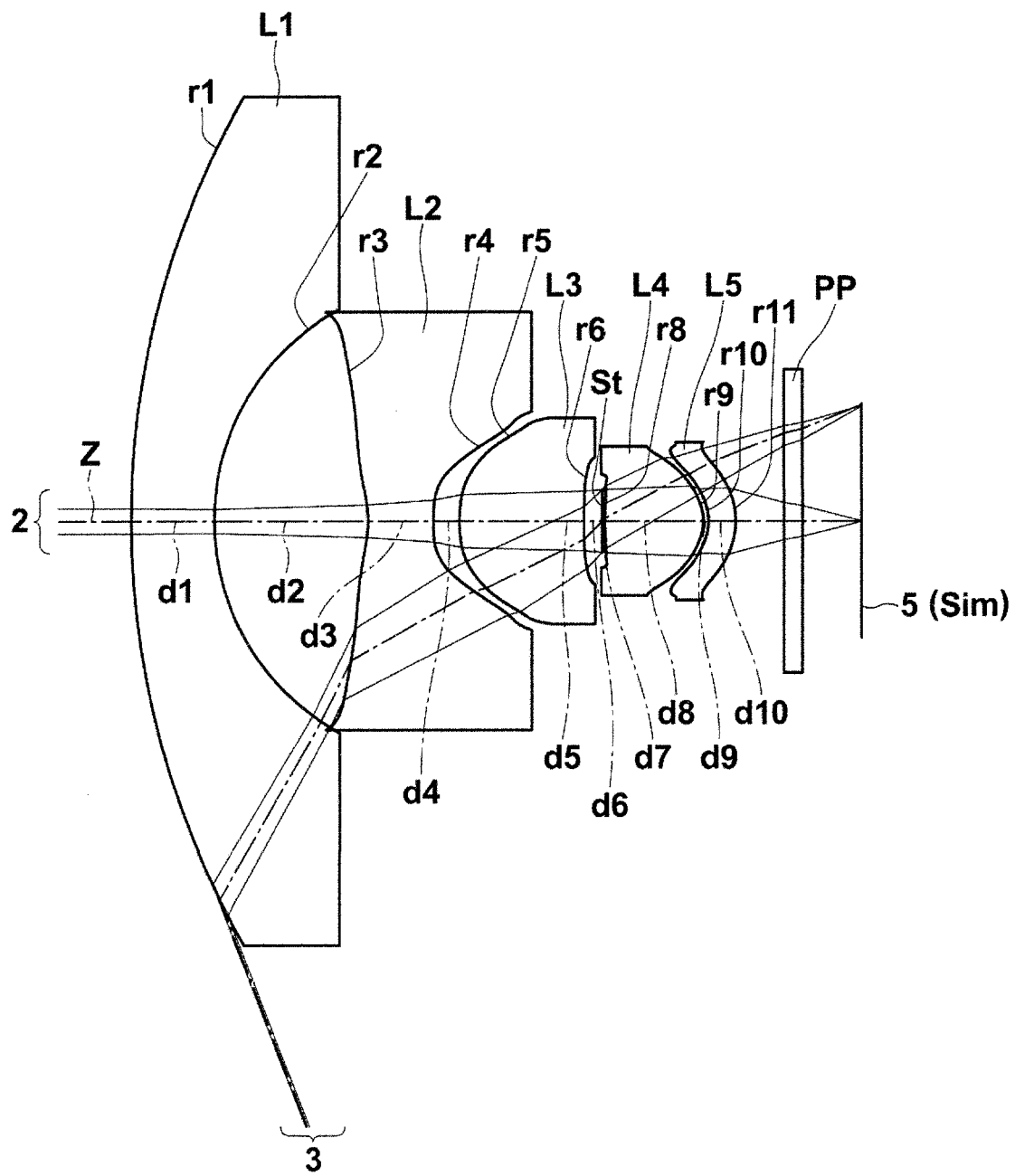
FIG. 5 is a cross section illustrating a lens structure and optical paths of an imaging lens in Example 5 of the present invention.
Figure 6:
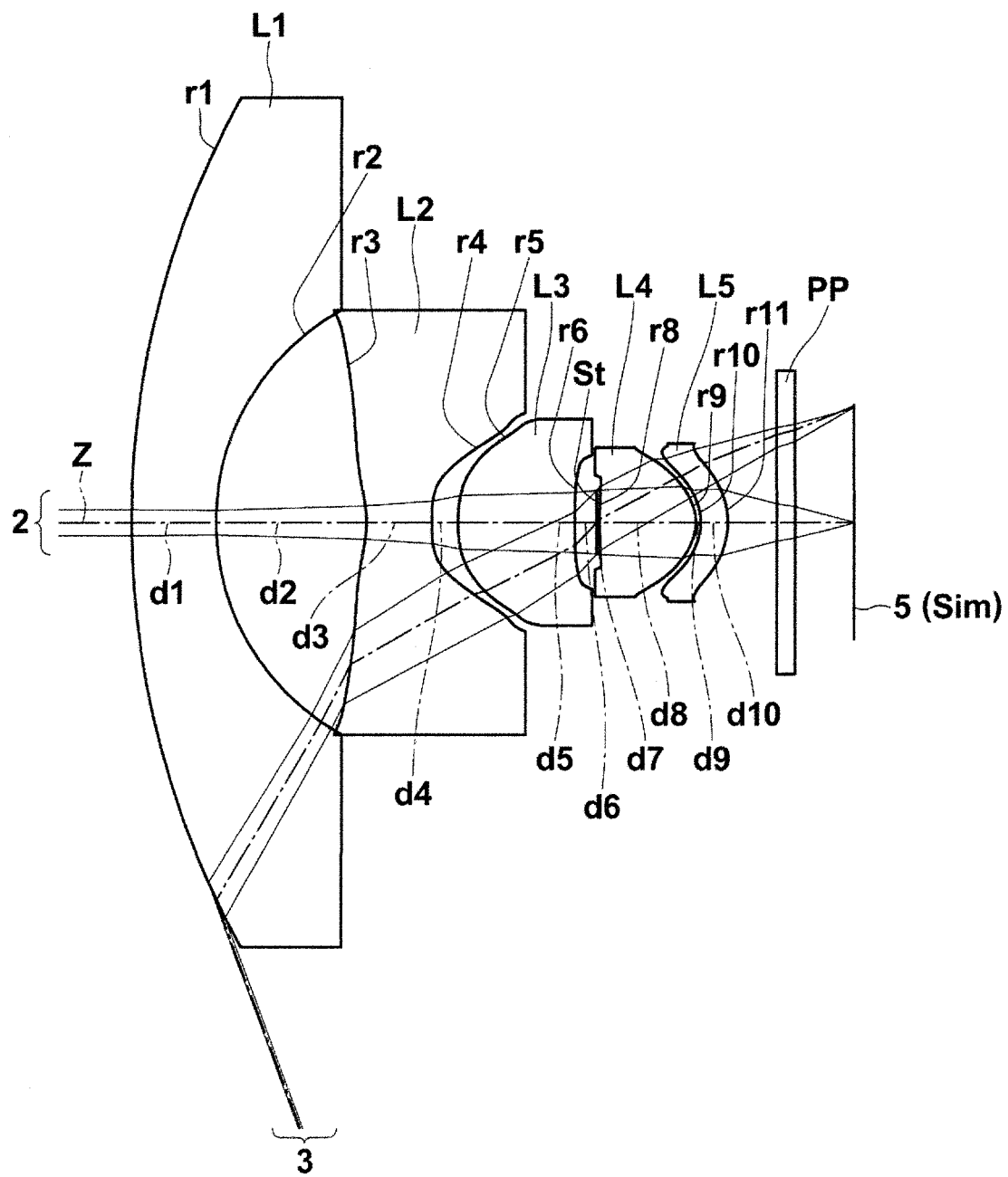
FIG. 6 is a cross section illustrating a lens structure and optical paths of an imaging lens in Example 6 of the present invention.
Figure 7:
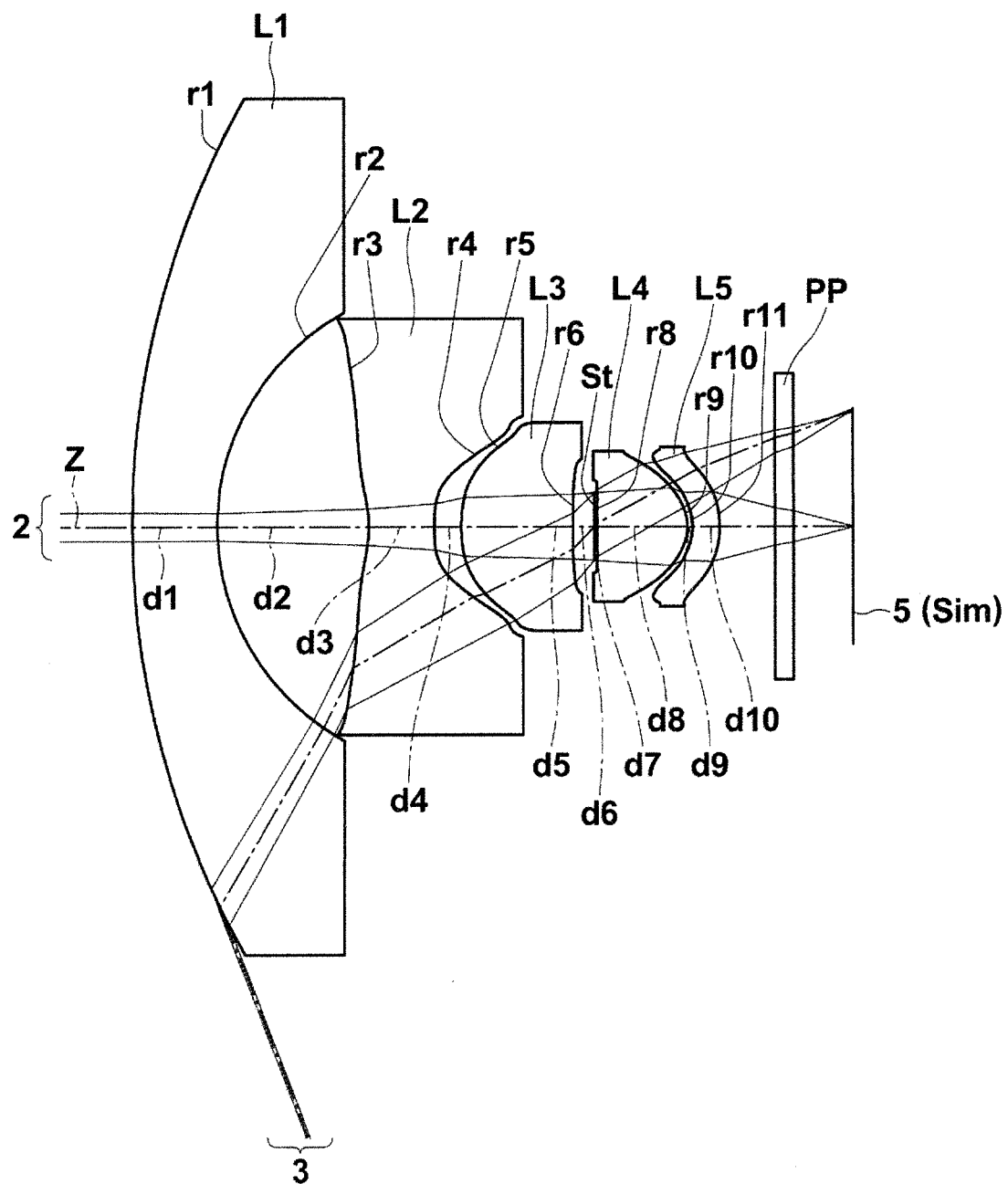
FIG. 7 is a cross section illustrating a lens structure and optical paths of an imaging lens in Example 7 of the present invention.
Figure 8:
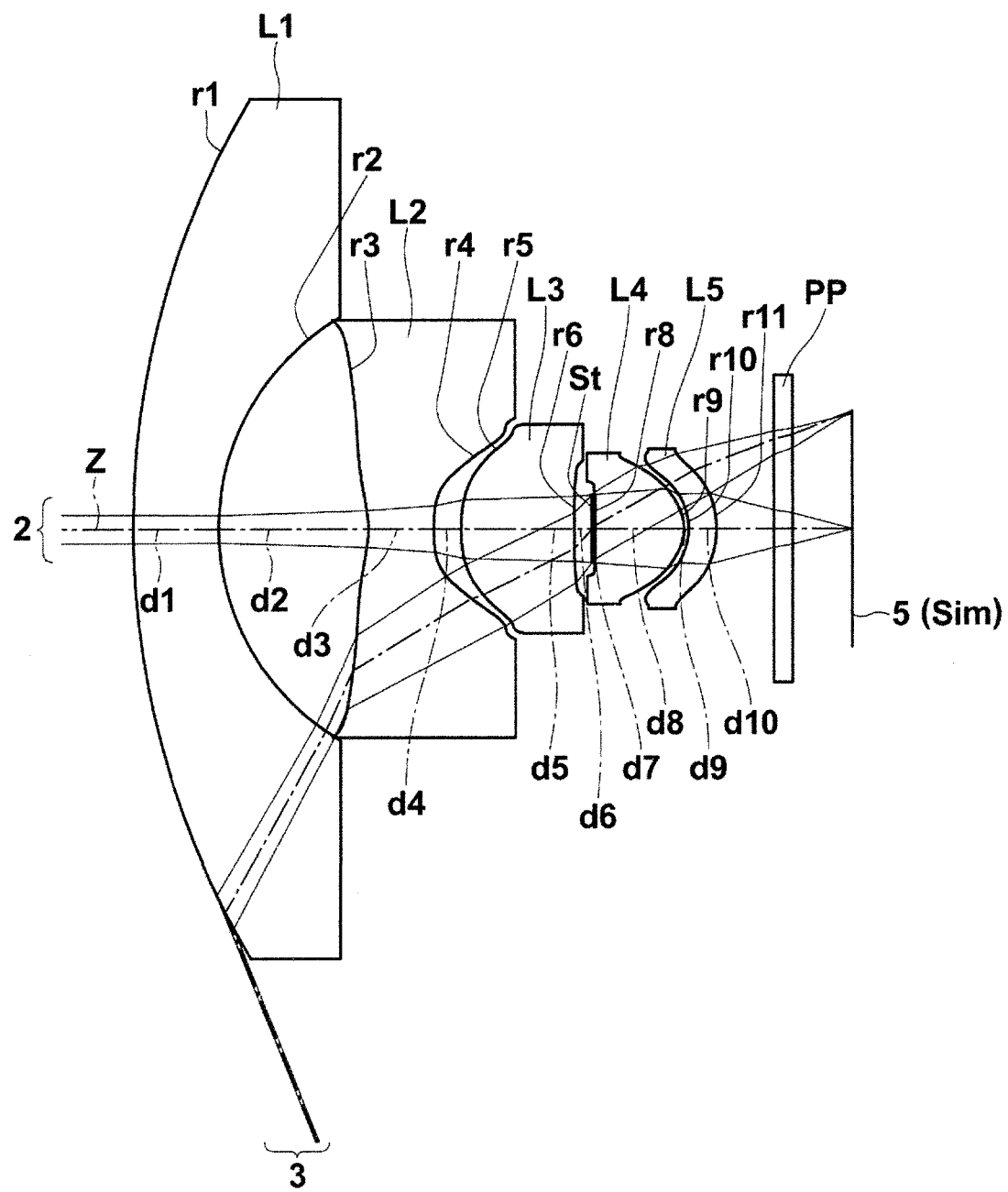
FIG. 8 is a cross section illustrating a lens structure and optical paths of an imaging lens in Example 8 of the present invention.

In FIG. 1, the left side is the object side and the right side is the image side. Illustrated aperture stop St does not necessarily represent the size nor the shape of aperture stop St, but represents the position of aperture stop St on the optical axis. In FIG. 1, sign ri (i=1, 2, 3, . . . ) represents the curvature radius of each lens surface, and sign di (i=1, 2, 3 . . . ) represents a distance between surfaces. Further, FIG. 1 illustrates axial rays 2 from an object point at infinity, and off-axial rays 3 at maximum angle of view.

In FIG. 1, a case of applying the imaging lens to an imaging apparatus is taken into consideration, and an imaging device 5 arranged at image plane Sim of the imaging lens is also illustrated. When the imaging lens is applied to an imaging apparatus, it is desirable to set a cover glass, and a low-pass filter or an infrared ray cut filter, or the like based on the structure of a camera on which the lens is mounted. FIG. 1 illustrates an example in which parallel-flat-plate-shaped optical member PP, which is assumed to be such elements, is arranged between fifth lens L5 and the imaging device 5 (image plane Sim).

First lens L1 is a meniscus lens having negative refractive power, and the object-side surface of which is convex. Such structure in which first lens L1 is a meniscus lens having negative refractive power, and the object-side surface of which is convex, is advantageous to widening an angle of view and correcting distortion. First lens L1, which is arranged on the most object side, is likely be exposed to wind and rain or solvent for cleaning. Therefore, there is a risk that dirt, dust, droplets of water or the like remains on first lens L1. The convex shape of the object-side surface of first lens L1 is advantageous to reducing such a risk.

In the example illustrated in FIG. 1, first lens L1 is a spherical lens. Alternatively, first lens L1 may be an aspherical lens. However, as the material of first lens L1, which is arranged on the most object side, glass is more desirable than resin, as will be described later. Therefore, when first lens L1 is a spherical lens, first lens L1 is producible at lower cost, compared with a case in which first lens L1 is an aspherical lens.

At least one of the surfaces of each of second lens L2, third lens L3, fourth lens L4 and fifth lens L5 is aspherical. When at least one of the surfaces of each of second lens L2, third lens L3, fourth lens L4 and fifth lens L5 is aspherical, it is possible to achieve high resolution while reducing the total length of the optical system in the optical axis direction. Further, it is possible to excellently correct various aberrations, such as a spherical aberration, a coma aberration, curvature of field and distortion, while structuring the system using a small number of lenses. It is desirable that both surfaces of each of second lens L2, third lens L3, fourth lens L4 and fifth lens L5 are aspherical to more excellently correct aberrations.

The image-side surface of second lens L2 has a convex shape facing the image side in the vicinity of the optical axis, and second lens L2 has negative refractive power.

With reference to FIG. 1, the shape of the image-side surface of second lens L2 will be described. In FIG. 1, point Q1 and point Q2 are two effective diameter outermost edge points on the image-side surface of second lens L2, and point Q3 is a point on the optical axis on the image-side surface of second lens L2. In FIG. 1, arc C2 is an arc that passes through the three points of point Q1, point Q2 and point Q3. Arc C2 will be described later.

Further, a point on the image-side surface of second lens L2 in the vicinity of point Q3 is point X4, and an intersection of a normal at point X4 and the optical axis is point P4. At this time, the shape of second lens L2 at point X4 is defined based on whether point P4 is located on the object side of point Q3 or on the image side of point Q3. The shape of the image-side surface is defined as a convex shape facing the image side when point P4 is located on the object side of point Q3. The shape of the image-side surface is defined as a concave shape facing the image side when point P4 is located on the image side of point Q3.

The expression "the image-side surface has a convex shape facing the image side in the vicinity of the optical axis" means a shape in which point P4 is located on the object side of point Q3 in the vicinity of the optical axis.

When the image-side surface of second lens L2 has a convex shape facing the image side in the vicinity of the optical axis, and second lens L2 has negative refractive power, it is possible to suppress an angle of incidence of axial rays passing through the image-side surface of second lens L2 so that the angle is small. Therefore, it is possible to excellently correct a spherical aberration.

Third lens L3, fourth lens L4 and fifth lens L5 have positive refractive power, positive refractive power and negative refractive power, respectively.

Further, the imaging lens according to the first embodiment satisfies the following conditional formula (2-1):

$$0.11 < d1 \cdot 4/L$$ (2-1), where

L: a distance on the optical axis from an object-side surface of first lens L1 to an image plane (a distance between fifth lens L5 and the image plane is a distance in air), and d1-4: a distance on the optical axis from the object-side surface of first lens L1 to the image-side surface of second lens L2.

If the value is lower than the lower limit of conditional formula (2-1), first lens L1 and second lens L2 are located close to each other at their peripheral portions, and it becomes impossible to arrange them in an appropriate manner.

In the imaging lens according to the first embodiment of the present invention, the refractive power and the shape of each of first lens L1 through fifth lens L5 are appropriate set, as described above, in a five-group five-element lens structure. Further, aperture stop St is arranged between third lens L3 and fourth lens L4. Therefore, a sufficiently wide angle of view and a sufficiently large maximum aperture are achieved while the imaging lens consists of a small number of lenses, and the total length of the imaging lens is short, and the size of the imaging lens is small, and the cost of the imaging lens is low. Further, it is possible to correct various aberrations including a spherical aberration, a coma aberration, curvature of field and distortion in an excellent manner. Further, according to the imaging lens in the first embodiment of the present invention, it is possible to achieve high resolution in a wide range of image formation area. Therefore, it is possible to cope with an imaging device the resolution of which became higher in recent years.

Next, the structure of the second embodiment of the present invention will be described. The imaging lens according to the second embodiment of the present invention is a lens system composed of five lenses, in which first lens L1, second lens L2, third lens L3, fourth lens L4 and fifth lens L5 are arranged along optical axis Z in this order from an object side. Aperture stop St is arranged between third lens L3 and fourth lens L4. Since aperture stop St is arranged between third lens L3 and fourth lens L4, it is possible reduce the size of the imaging lens in the diameter direction.

First lens L1 is a meniscus lens having negative refractive power, and the object-side surface of which is convex. Such structure in which first lens L1 is a meniscus lens having negative refractive power, and the object-side surface of which is convex, is advantageous to widening an angle of view and correcting distortion. First lens L1, which is arranged on the most object side, is likely be exposed to wind and rain or solvent for cleaning. Therefore, there is a risk that dirt, dust, droplets of water or the like remains on first lens L1. The convex shape of the object-side surface of first lens L1 is advantageous to reducing such a risk.

At least one of the surfaces of each of second lens L2, third lens L3, fourth lens L4 and fifth lens L5 is aspherical. When at least one of the surfaces of each of second lens L2, third lens L3, fourth lens L4 and fifth lens L5 is aspherical, it is possible to achieve high resolution while reducing the total length of the optical system in the optical axis direction. Further, it is possible to excellently correct various aberrations, such as a spherical aberration, a coma aberration, curvature of field and distortion, while structuring the system using a small number of lenses. It is desirable that both surfaces of each of second lens L2, third lens L3, fourth lens L4 and fifth lens L5 are aspherical to more excellently correct aberrations.

Second lens L2, third lens L3, fourth lens L4 and fifth lens L5 have negative refractive power, positive refractive power, positive refractive power and negative refractive power, respectively.

Further, the imaging lens according to the second embodiment satisfies the following conditional formula (2-2):

$$0.40 < d1\text{-}4/L \quad (2\text{-}2),$$

where

L: a distance on the optical axis from an object-side surface of first lens L1 to an image plane (a distance between fifth lens L5 and the image plane is a distance in air), and d1-4: a distance on the optical axis from the object-side surface of first lens L1 to the image-side surface of second lens L2.

If the value is lower than the lower limit of conditional formula (2-2), first lens L1 and second lens L2 are located close to each other at their peripheral portions, and it becomes impossible to arrange them in an appropriate manner.

In the imaging lens according to the second embodiment of the present invention, the refractive power and the shape of each of first lens L1 through fifth lens L5 are appropriate set, as described above, in a five-group five-element lens structure. Further, aperture stop St is arranged between third lens L3 and fourth lens L4. Therefore, a sufficiently wide angle of view and a sufficiently large maximum aperture are achieved while the imaging lens consists of a small number of lenses, and the total length of the imaging lens is short, and the size of the imaging lens is small, and the cost of the imaging lens is low. Further, it is possible to correct various aberrations including a spherical aberration, a coma aberration, curvature of field and distortion in an excellent manner. Further, according to the imaging lens in the second embodiment of the present invention, it is possible to achieve high resolution in a wide range of image formation area. Therefore, it is possible to cope with an imaging device the resolution of which became higher in recent years.

In the imaging lens according to the first and second embodiments of the present invention (hereinafter, referred to as embodiments of the present invention), it is desirable that the Abbe number of the material of first lens L1 for d-line is greater than or equal to 40. It is desirable that the Abbe number of the material of second lens L2 for d-line is greater than or equal to 50. It is desirable that the Abbe number of the material of third lens L3 for d-line is less than or equal to 30. It is desirable that the Abbe number of the material of fourth lens L4 for d-line is greater than or equal to 50. It is desirable that the Abbe number of the material of fifth lens L5 for d-line is less than or equal to 30.

When first lens L1, second lens L2, third lens L3, fourth lens and fifth lens L5 have negative refractive power, negative refractive power, positive refractive power, positive refractive power and negative refractive power, respectively, in the vicinity of the optical axis, and materials with appropriate Abbe numbers are selected for the lenses, it is possible to excellently correct a lateral chromatic aberration while achieving a wide angle lens exceeding 200 degrees.

It is desirable that a distance between fourth lens L4 and fifth lens L5 is short, and does not substantially change from a central portion through a peripheral portion of the lenses. Further, it is desirable that the thickness of fifth lens L5 at its central portion and the thickness of fifth lens L5 at its peripheral portion do not substantially differ from each other. Then, rays pass through the image-side surface of fourth lens L4, the object-side surface of fifth lens L5 and the image-side surface of fifth lens L5 at substantially the same angle for any angle of view. Therefore, it is possible to prevent sudden generation of aberrations by production error or the like.

It is desirable that the imaging lens according to the embodiment of the present invention further includes the following structure or structures. A desirable mode may include one of the following structures, or arbitrary two or more of them in combination.

It is desirable that the following conditional formula (7) is satisfied:

$$0.08 < d4\text{-}5/f \qquad (7),$$

where d4-5: a distance on the optical axis from the image-side surface of second lens L2 to the object-side surface of third lens L3, and f: a focal length of an entire system.

If the value is lower than the lower limit of conditional formula (7), second lens L2 and third lens L3 are too close to each other, and a risk of touching each other increases. Further, it becomes difficult to remove ghost light caused by the two surfaces of the image-side surface of second lens L2 and the object-side surface of third lens L3.

It is desirable that the following conditional formula (8) is satisfied:

$$0.04 < d10/f \qquad (8),$$

where d10: the thickness of fifth lens L5 on the optical axis.

If the value is lower than the lower limit of conditional formula (8), the thickness of fifth lens L5 becomes too small, and production becomes difficult.

It is desirable that the following conditional formula (9) is satisfied:

$$0.48 < f3/f \qquad (9),$$

where f3: a focal length of third lens L3.

If the value is lower than the lower limit of conditional formula (9), the refractive power of third lens L3 becomes too strong, and the sensitivity to a change in aberrations caused by an error in shape and eccentricity becomes high. Therefore, high accuracy in shape and assembly becomes required.

It is desirable that the following conditional formula (10) is satisfied:

$$0.71 < Bf/f \qquad (10),$$

where

Bf: a back focus of an entire system.

If the value is lower than the lower limit of conditional formula (10), the image-side surface of fifth lens L5 and the image plane become too close to each other, and a defect, such as a scratch on a lens, greatly affects an image. Further, it becomes difficult to arrange the lens in an appropriate manner.

It is desirable that the following conditional formula (11) is satisfied:

$$r10/f < -0.25 \qquad (11),$$

where r10: a curvature radius of an object-side surface of fifth lens L5 in the vicinity of the optical axis.

If the value exceeds the upper limit of conditional formula (11), the absolute value of the curvature radius of the object-side surface of fifth lens L5 in the vicinity of the optical axis becomes too small. Therefore, it becomes difficult to excellently correct a spherical aberration. When the curvature radius of the object-side surface of fifth lens L5 is set at an appropriate value so that desirable optical performance is achievable, if the value exceeds the upper limit of conditional formula (11), a focal length becomes long. Hence, it becomes impossible to secure a necessary angle of view.

It is desirable that the following conditional formula (12) is satisfied:

$$1.2 < L/f \qquad (12).$$

If the value is lower than the lower limit of conditional formula (12), when a distance on the optical axis from the object-side surface of first lens L1 to the image plane is set at an appropriate length, the focal length becomes long. Therefore, it becomes impossible to obtain a large angle of view.

It is desirable that the following conditional formula (13) is satisfied:

$$(r8+r9)/(r8-r9) < 2.9 \qquad (13),$$

where r8: a curvature radius of an object-side surface of fourth lens L4 in the vicinity of the optical axis, and r9: a curvature radius of an image-side surface of fourth lens L4 in the vicinity of the optical axis.

If the value exceeds the upper limit of conditional formula (13), the absolute value of the curvature radius of the object-side surface of fourth lens L4 in the vicinity of the optical axis becomes too small, or the absolute value of the curvature radius of the image-side surface of fourth lens L4 in the vicinity of the optical axis becomes too small. Therefore, it becomes difficult to excellently correct a spherical aberration.

It is more desirable that the following conditional formulas (7-1) through (13-1) are satisfied. When conditional formulas (7-1) and (13-1) are satisfied, it is possible to achieve effects similar to those achievable by satisfying conditional formulas (7) through 13), or to further enhance the effects:

$$0.20 < d4\text{-}5/f < 0.60 \qquad (7\text{-}1);$$

$$0.20 < d10/f < 0.80 \qquad (8\text{-}1);$$

$$2.0 < f3/f < 20.0 \qquad (9\text{-}1);$$

$$1.5 < Bf/f < 3.0 \qquad (10\text{-}1);$$

$$-5.0 < r10/f < -0.50 \qquad (11\text{-}1);$$

$$5.0 < L/f < 20.0 \qquad (12\text{-}1); \text{ and}$$

$$(r8+r9)/(r8-r9) < 2.0 \qquad (13\text{-}1).$$

If the value exceeds the upper limit of conditional formula (7-1), the structure is disadvantageous to minimizing the total lens length.

If the value exceeds the upper limit of conditional formula (8-1), the structure is disadvantage to reducing the total lens length. Further, it becomes difficult to provide a sufficient back focus.

If the value exceeds the upper limit of conditional formula (9-1), the refractive power of third lens L3 becomes too weak, and correction of a lateral chromatic aberration becomes insufficient.

If the value exceeds the upper limit of conditional formula (10-1), it is possible to provide a sufficient distance between fifth lens L5 and an image plane. However, a distance from the object-side surface of first lens L1 to the image plane becomes long. Therefore, the size of the imaging lens according to the embodiment of the present invention and the size of an imaging apparatus, such as a camera, to which the imaging lens according to the embodiment of the present invention has been applied become large.

If the value is lower than the lower limit of conditional formula (11-1), a space between fourth lens L4 and fifth lens L5 tends to become larger from the optical axis toward the outside. Therefore, rays passing through fifth lens L5 are away from the optical axis, and the outer diameter of fifth lens L5 becomes large. Hence, the flexibility in selection of the shape of a lens barrel of the imaging lens according to the embodiment of the present invention becomes low.

If the value exceeds the upper limit of conditional formula (12-1), a distance from the object-side surface of first lens L1 to the image plane becomes long. Therefore, the size of the imaging lens according to the embodiment of the present invention and the size of an imaging apparatus, such as a camera, to which the imaging lens according to the embodiment of the present invention has been applied become large.

With respect to second lens L2, third lens L3, fourth lens L4 and fifth lens L5, arcs, each of which passes through three points of two effective diameter outermost edge points and a point on an optical axis, are defined for an object-side surface and an image-side surface in a cross section including the optical axis. When it is assumed that each of the lenses has a whole shape in which the object-side surface and the image-side surface have curvature radii of the arcs, respectively, if the image-side surface of second lens L2 has a concave shape facing the image side, and second lens L2 has negative refractive power, and the object-side surface of third lens L3 has a convex shape facing the object side, and third lens has positive refractive power, and the image-side surface of fourth lens L4 has a convex shape facing the image side, and fourth lens L4 has positive refractive power, and fifth lens L5 has a meniscus shape with its convex surface facing the image side and negative refractive power, it is desirable that the following conditional formulas (1) through (6) are satisfied:

$$0.10 < f34/L < 0.17 \quad (1);$$

$$0.40 < d1\text{-}4/L < 0.50 \quad (2);$$

$$0.45 < d3\text{-}11/L < 0.54 \quad (3);$$

$$0.02 < d4\text{-}5/L < 0.05 \quad (4);$$

$$0.012 < d6\text{-}8/L < 0.04 \quad (5); \text{ and}$$

$$L/r3 < -6.0 \quad (6), \text{ where}$$

f34: a combined paraxial focal length of third lens L3 and fourth lens L4,

L: a distance on an optical axis from an object-side surface of first lens L1 to an image plane (a distance between fifth lens L5 and the image plane is a distance in air), d1-4: a distance on an optical axis from an object-side surface of first lens L1 to an image-side surface of second lens L2, d3-11: a distance on an optical axis from an object-side surface of second lens L2 to an image-side surface of fifth lens L5, d4-5: a distance on an optical axis from an image-side surface of second lens L2 to an object-side surface of third lens L3, d6-8: a distance on an optical axis from an image-side surface of third lens L3 to an object-side surface of fourth lens L4, and r3: a curvature radius of an object-side surface of second lens L2 in the vicinity of an optical axis.

Here, with reference to FIG. 1, the shape of the image-side surface of second lens L2 when second lens L2 is assumed to have the aforementioned whole shape will be described. As described above, arc C2 is an arc that passes through three points Q1, Q2 and Q3.

Regarding second lens L2, the expression "the image-side surface has a concave shape facing the image side" means that arc C2, which passes through the three points of point Q1, point Q2 and point Q3, has a concave shape facing the image side when it is assumed that the image-side surface of second lens L2 has a lens surface defined by arc C2. In other words, the image-side surface of second lens L2 has a shape in which point Q3 is located at a more object-side position, compared with point Q1 and point Q2. Further, the expression "has negative refractive power" means that the refractive power of a lens having a whole shape assumed with respect to the object side and the image side is negative.

When it is assumed that third lens L3 has a whole shape as described above, the shape of the object-side surface of third lens L3 may be considered in a similar manner to second lens L2, which has been described already. Specifically, the expression "the object-side surface has a convex shape facing the object side" means that arc C3, which passes through three points of two effective diameter outermost edge points Q11 and Q12 on the object-side surface of third lens L3 and point Q13 on an optical axis on the object-side surface of third lens L3, has a convex shape facing the object side when it is assumed that the object-side surface of third lens L3 has a lens surface defined by arc C3. In other words, the object-side surface of third lens L3 has a shape in which point Q13 is located at a more object-side position, compared with point Q11 and point Q12. Further, the expression "has positive refractive power" means that the refractive power of a lens having a whole shape assumed with respect to the object side and the image side is positive.

When it is assumed that fourth lens L4 has a whole shape as described above, the shape of the image-side surface of fourth lens L4 may be considered in a similar manner to second lens L2, which has been described already. Specifically, the expression "the image-side surface has a convex shape facing the image side" means that arc C4, which passes through three points of two effective diameter outermost edge points Q21 and Q22 on the image-side surface of fourth lens L4 and point Q23 on an optical axis on the image-side surface of fourth lens L4, has a convex shape facing the image side when it is assumed that the image-side surface of fourth lens L4 has a lens surface defined by arc C4. In other words, the image-side surface of fourth lens L4 has a shape in which point Q23 is located at a more image-side position, compared with point Q21 and point Q22. Further, the expression "has positive refractive power" means that the refractive power of a lens having a whole shape assumed with respect to the object side and the image side is positive.

When it is assumed that fifth lens L5 has a whole shape as described above, the shape of the image-side surface of fifth lens L5 may be considered in a similar manner to second lens L2, which has been described already. Specifically, the expression "a meniscus shape with its convex surface facing the image side" means a meniscus shape in which arc C5, which passes through three points of two effective diameter outermost edge points Q31 and Q32 on the image-side surface of fifth lens L5 and point Q33 on an optical axis on the image-side surface of fifth lens L5, is convex toward the image side when it is assumed that the image-side surface of fifth lens L5 has a lens surface defined by arc C5. In other words, fifth lens L5 has a meniscus shape in which point Q33 is located at a more image-side position, compared with point Q31 and point Q32. Further, the expression "has negative refractive power" means that the refractive power of a lens having a whole shape assumed with respect to the object side and the image side is negative.

If the value is lower than the lower limit of conditional formula (1), the absolute value of the refractive power of third lens L3 and fourth lens L4 becomes too large, and requirement regarding production error of each lens and accurate registration becomes high. Therefore, the production characteristics become lower, and that causes an increase in cost. If the value exceeds the upper limit of conditional formula (1), the refractive power of the entire lens system becomes insufficient, and a necessary angle of view is not obtainable.

If the value is lower than the lower limit of conditional formula (2), first lens L1 and second lens L2 are located close to each other at their peripheral portions, and it becomes impossible to arrange them in an appropriate manner. If the value exceeds the upper limit of conditional formula (2), the effective diameter of first lens L1 becomes large, and the total length and the outer diameter of the entire lens system become large.

If the value is lower than the lower limit of conditional formula (3), the thicknesses of second lens L2 through fifth lens L5 and distances between lenses of second lens L2 through fifth lens L5 need to be reduced. Therefore, the production characteristics of each lens deteriorate, and it becomes impossible to appropriately set the refractive power of each lens. Further, it becomes difficult to correct chromatic aberrations in an excellent manner. If the value exceeds the upper limit of conditional formula (3), it becomes impossible to achieve reduction in the size of the lens, and the size of the lens becomes large.

If the value is lower than the lower limit of conditional formula (4), second lens L2 and third lens L3 are too close to each other, and a risk of touching each other increases. Further, it becomes difficult to remove ghost light caused by the two surfaces of the image-side surface of second lens L2 and the object-side surface of third lens L3. If the value exceeds the upper limit of conditional formula (4), it becomes difficult to reduce the total length of the lens.

If the value is lower than the lower limit of conditional formula (5), third lens L3 and fourth lens L4 are too close to each other, and it becomes difficult to form aperture stop St between them. If the value exceeds the upper limit of conditional formula (5), it becomes difficult to reduce the total length of the lens.

If the value exceeds the upper limit of conditional formula (6), it becomes difficult to correct a spherical aberration in an excellent manner.

When second lens L2 has negative refractive power, it is desirable that the aforementioned conditional formula (2-2) and the following conditional formula (2-3) are satisfied:

$$0.40 < d1\text{-}4/L < 0.60 \qquad (2\text{-}3).$$

If the value is lower than the lower limit of conditional formula (2-3), a peripheral portion of first lens L1 and a peripheral portion of second lens L2 become close to each other. Therefore, it becomes impossible to arrange the lenses in an appropriate manner. If the value exceeds the upper limit of conditional formula (2-3), the effective diameter of first lens L1 becomes large, and the total length and the outer diameter of the entire lens system become large.

When second lens L2 has negative refractive power, it is desirable that the following conditional formulas (7-2) and (8-2) are satisfied:

$$d4\text{-}5/f < 1.76 \qquad (7\text{-}2); \text{ and}$$

$$0.08 < d10/f < 0.54 \qquad (8\text{-}2).$$

If the value exceeds the upper limit of conditional formula (7-2), the distance between second lens L2 and third lens L3 becomes too long, and the size of the entire lens becomes large. Further, it becomes difficult to correct a coma aberration.

If the value is lower than the lower limit of conditional formula (8-2), the thickness of fifth lens L5 becomes too small, and production becomes difficult. If the value exceeds the upper limit of conditional formula (8-2), the thickness of fifth lens L5 becomes too large, and the size of a lens becomes large. If a distance from the object-side surface of first lens L1 to the image plane is tried to be suppressed, it becomes difficult to secure a sufficient back focus.

When second lens L2 has negative refractive power, it is more desirable that the following conditional formulas (7-3) and (8-3) are satisfied. When conditional formulas (7-3) and (8-3) are satisfied, it is possible to enhance the effect achievable by satisfying conditional formulas (7-2) and (8-2).

$$0.15 < d4\text{-}5/f < 0.66 \qquad (7\text{-}3)$$

$$0.46 < d10/f < 0.54 \qquad (8\text{-}3)$$

If the value is lower than the lower limit of conditional formula (7-3), second lens L2 and third lens L3 are too close to each other, and a risk of touching each other increases. Further, it becomes difficult to remove ghost light caused by the two surfaces of the image-side surface of second lens L2 and the object-side surface of third lens L3.

When second lens L2 has negative refractive power, it is desirable that the following conditional formulas (9-2) and (10-2) are satisfied:

$$4.7 < f3/f \qquad (9\text{-}2); \text{ and}$$

$$1.84 < Bf/f \qquad (10\text{-}2).$$

If the value is lower than the lower limit of conditional formula (9-2), the refractive power of third lens L3 becomes too strong, and the sensitivity to a change in aberrations caused by an error in shape and eccentricity becomes high. Hence, high accuracy in shape and assembly becomes required.

If the value is lower than the lower limit of conditional formula (10-2), the image-side surface of fifth lens L5 and the image plane become too close to each other, and a defect, such as a scratch on a lens, greatly affects an image. Further, it becomes difficult to arrange the lens in an appropriate manner.

When second lens L2 has negative refractive power, it is more desirable that the following conditional formulas (9-3) and (10-3) are satisfied. When conditional formulas (9-3) and (10-3) are satisfied, it is possible to enhance the effect achievable by satisfying conditional formulas (9-2) and (10-2).

$$4.7 < f3/f < 20.0 \qquad (9\text{-}3)$$

$$1.77 < Bf/f < 2.3 \qquad (10\text{-}3)$$

If the value exceeds the upper limit of conditional formula (9-3), the refractive power of third lens L3 becomes too weak, and correction of a lateral chromatic aberration becomes insufficient. If the value exceeds the upper limit of conditional formula (10-3), it is possible to make a distance from fifth lens L5 to the image plane sufficient, but a distance from the object-side surface of first lens L1 to the image plane becomes long. Therefore, the size of the imaging lens according to the embodiment of the present invention and the size of an imaging apparatus, such as a camera, to which the imaging lens according to the embodiment of the present invention has been applied become large.

It is desirable that the following conditional formulas (11-2) and (12-2) are satisfied:

$$-1.33 < r10/f < -0.64 \qquad (11\text{-}2); \text{ and}$$

$$11.9 < L/f \qquad (12\text{-}2).$$

If the value is lower than the lower limit of conditional formula (11-2), when a focal length required for the angle of view is appropriately set, the curvature radius of the object-side surface of fifth lens L5 in the vicinity of the optical axis becomes large. Therefore, the effect of correcting a spherical aberration becomes low. If the value exceeds the upper limit of conditional formula (11-2), the absolute value of the curvature radius of the object-side surface of fifth lens L5 in the vicinity of the optical axis becomes too small. Therefore, it becomes difficult to excellently correct a spherical aberration. When the curvature radius of the object-side surface of fifth lens L5 is set at an appropriate value so that desirable optical performance is achievable, if the value exceeds the upper limit of conditional formula (11-2), a focal length becomes long. Hence, it becomes impossible to secure a necessary angle of view.

If the value is lower than the lower limit of conditional formula (12-2), when a distance on the optical axis from the object-side surface of first lens L1 to the image plane is set at an appropriate length, the focal length becomes long. Hence, it becomes impossible to obtain a large angle of view.

It is more desirable that the following conditional formula 12-3) is satisfied:

$$11.9<L/f<20.0 \quad (12\text{-}3).$$

If the value exceeds the upper limit of conditional formula (12-3), a distance from the object-side surface of first lens L1 to the image plane becomes long. Therefore, the size of the imaging lens according to the embodiment of the present invention becomes large. Further, the size of an imaging apparatus, such as a camera, to which the imaging lens according to the embodiment of the present invention has been applied becomes large.

When the object-side surface of second lens L2 has a concave shape facing the object side in the vicinity of the optical axis, and second lens L2 has negative refractive power, it is desirable that the following conditional formulas (13-2) and (12-4) are satisfied:

$$0.75<(r8+r9)/(r8-r9)<2.96 \quad (13\text{-}2); \text{ and}$$

$$1.6<L/f<15.7 \quad (12\text{-}4).$$

Here, the shape of the object-side surface of second lens L2 may be considered in a similar manner to the shape of the image-side surface of second lens L2. In FIG. 1, an intersection of the object-side surface of second lens L2 and the optical axis is point Q13, and a point on the object-side surface of second lens L2 in the vicinity of point Q13 is point X3. Further, an intersection of a normal at point X3 and the optical axis is point P3. At this time, the shape of second lens L2 at point X3 is defined based on whether point P3 is located on the object side of point Q13 or on the image side of point Q13. The shape of an object-side surface is defined as a concave shape facing the object side when point P3 is located on the object side of point Q13. The shape of the object-side surface is defined as a convex shape facing the object side when point P3 is located on the image side of point Q13.

The expression "the object-side surface has a concave shape facing the object side in the vicinity of the optical axis" means a shape in which point P3 is located on the object side of point Q13 in the vicinity of the optical axis.

When the object-side surface of second lens L2 has a concave shape facing the object side in the vicinity of the optical axis, and second lens L2 has negative refractive power, it is possible to suppress an angle of incidence of axial rays passing through the image-side surface of second lens L2 so that the angle is small. Therefore, it is possible to excellently correct a spherical aberration.

If the value is lower than the lower limit of conditional formula (13-2) or exceeds the upper limit of conditional formula (13-2), the absolute value of the curvature radius of the object-side surface of fourth lens L4 in the vicinity of the optical axis becomes too small, or the absolute value of the curvature radius of the image-side surface of fourth lens L4 in the vicinity of the optical axis becomes too small. Therefore, it becomes difficult to excellently correct a spherical aberration.

If the value is lower than the lower limit of conditional formula (12-4), when a distance on the optical axis from the object-side surface of first lens L1 to the image plane is set at an appropriate length, the focal length becomes long. Therefore, it becomes impossible to obtain a large angle of view. If the value exceeds the upper limit of conditional formula (12-4), when a necessary angle of view is secured, a distance from the object-side surface of first lens L1 to the image plane becomes too long. Therefore, the size of the imaging lens according to the embodiment of the present invention and the size of an imaging apparatus, such as a camera, to which the imaging lens according to the embodiment of the present invention has been applied become large.

When the object-side surface of second lens L2 has a concave shape facing the object side in the vicinity of the optical axis, and second lens L2 has negative refractive power, it is more desirable that the following conditional formulas (13-3) and (12-5) are satisfied. When conditional formulas (13-3) and (12-5) are satisfied, it is possible to further enhance the effect achievable by satisfying conditional formulas (13-2) and (12-4).

$$0.75<(r8+r9)/(r8-r9)<2.0 \quad (13\text{-}3)$$

$$5.0<L/f<20.0 \quad (12\text{-}5)$$

It is desirable that the full angle of view of the imaging lens according to the embodiment of the present invention is greater than 200 degrees. The full angle of view is twice an angle formed by a principal ray of off-axial rays 3 at the maximum angle of view and optical axis Z. When the lens system has a wide angle of view with a full angle of view greater than 200 degrees, the lens system can cope with a need for a wider angle in recent years.

In the imaging lens according to the embodiment of the present invention, it is desirable that each of all of first lens L1 through fifth lens L5 is a single lens, which is not a cemented lens, for example, as illustrated in the example of FIG. 1. When use of an imaging lens according to the embodiment of the present invention in tough environment conditions, such as use in an in-vehicle camera or a surveillance camera, is expected, it is desirable that the imaging lens does not include any cemented lens. When the imaging lens does not include any cemented lens, it is possible to produce the imaging lens at low cost.

When an imaging lens according to an embodiment of the present invention is used in tough environment conditions, for example, such as use in an in-vehicle camera or a surveillance camera, first lens L1, which is arranged on the most object side, needs to use a material resistant to a deterioration of a surface by wind and rain and a change in temperature by direct sun light. Further, the material needs to be resistant to chemicals, such as oils and fats and detergents. In other words, the material needs to be highly water-resistant, weather-resistant, acid-resistant, chemical-resistant, and the like. For example, it is desirable to use a material with water durability of 1 by the powder method regulated by Japan Optical Glass Manufacturers' Association. Further, in some cases, first lens L1 needs to use a material that is hard and not easily breakable. If the material of first lens L1 is glass, it is possible to satisfy such needs. Alternatively, transparent ceramic may be used as the material of first lens L1.

Here, a protection means may be applied to the object-side surface of first lens L1 to increase the strength, scratch-resistance, and chemical-resistance of the surface. In that case, the material of first lens L1 may be plastic. The protection means may be a hard coating or a water-repellent coating.

It is desirable that plastic is used as the material of second lens L2, third lens L3, fourth lens L4 and fifth lens L5. In such a case, it is possible to accurately produce an aspherical shape and to reduce the weight and the cost.

When plastic is used as the material, it is desirable to select a material having low water absorption characteristics to minimize a change in performance by absorption of water. Further, it is desirable that the double refraction characteristics of the material, which cause a drop in resolution, are low. As material satisfying these conditions, it is desirable to select cycloolefin-based plastic for second lens L2 and fourth lens L4, and to select polycarbonate-based plastic or polyester-based plastic for third lens L3 and fifth lens L5.

When plastic is used as the material of at least one of second lens L2, third lens L3, fourth lens L4 and fifth lens L5, so-called nano composite material, in which particles smaller than the wavelength of light are mixed into plastic, may be used, as the material.

In the imaging lens according to an embodiment of the present invention, an anti-reflection coating may be applied to each lens to reduce ghost light, or the like. In that case, for example, in the imaging lens illustrated in FIG. 1, angles formed by tangent lines on a peripheral portion of the image-side surface of first lens L1 and an optical axis, angles formed by tangent lines on a peripheral portion of the image-side surface of second lens L2 and the optical axis, and angles formed by tangent lines on a peripheral portion of the object-side surface of third lens L3 and the optical axis are small. Therefore, the thickness of the anti-reflection coating in the peripheral portion is less than the thickness of the anti-reflection coating in a central portion. Therefore, it is possible to evenly reduce reflectance for the whole effective diameter by applying anti-reflection coating to at least one surface including the image-side surface of first lens L1 of the three surfaces so that a wavelength at which reflectance in the vicinity of the center is the lowest is longer than or equal to 600 nm and shorter than or equal to 900 nm. Consequently, it is possible to reduce ghost light.

If the wavelength at which reflectance in the vicinity of the center is the lowest is shorter than 600 nm, a wavelength at which reflectance in the peripheral portion is the lowest becomes too short. Therefore, reflectance on a long wavelength side becomes high. Hence, reddish ghost tends to be generated. If the wavelength at which reflectance in the vicinity of the center is the lowest is longer than 900 nm, a wavelength at which reflectance in the central portion is the lowest becomes too long. Therefore, reflectance on a short wavelength side becomes high. Hence, the tone of an image becomes quite reddish, and bluish ghost tends to be generated.

Further, in the imaging lens according to an embodiment of the present invention, rays of light passing through the outside of the effective diameter between lenses may become stray light, and reach the image plane. Further, the stray light may become ghost. Therefore, it is desirable that a light shield means for blocking the stray light is provided, if necessary. The light shield means may be provided, for example, by applying an opaque paint to a portion outside the effective diameter on the image side of a lens, or by providing there an opaque plate member. Alternatively, an opaque plate member, as a light shield means, may be provided in the optical path of rays that will become stray light.

Here, a filter that cuts ultraviolet light through blue light, or an IR (InfraRed) cut filter, which cuts infrared light, may be inserted between the lens system and the imaging device 5 based on the purpose of use of the imaging lens. Alternatively, a coating having properties similar to those of the filter may be applied to a lens surface.

FIG. 1 illustrates a case in which optical member PP, which is assumed to be various filters, is arranged between a lens system and the imaging device 5. Instead, the various filters may be arranged between lenses. Alternatively, a coating having an action similar to that of the various filters may be applied to a lens surface of one of the lenses included in the imaging lens.

Next, numerical value examples of imaging lenses of the present invention will be described. Lens cross sections of imaging lenses of Example 1 through Example 8 are illustrated in FIG. 1 through FIG. 8, respectively.

Table 1 shows lens data and aspherical surface data of the imaging lens of Example 1. Similarly, Tables 2 through 8 show lens data and aspherical surface data of the imaging lenses of Examples 2 through 8, respectively. Next, the meanings of signs in the tables will be described by using Example 1, as an example. The meanings of the signs are basically the same for Examples 2 through 8.

In the lens data of Table 1, the column of "surface" shows the surface number of the i-th surface (i=1, 2, 3, . . . ). The most object-side surface of composition elements is the first surface, and surface numbers sequentially increase toward the image side. The column of ri shows the curvature radius of the i-th surface, and the column of di shows a distance on optical axis Z between the i-th surface and the (i+1)th surface. Here, the sign of a curvature radius is positive when a surface is convex toward the object side, and the sign of a curvature radius is negative when a surface is convex toward the image side. In each example, signs ri, di (i=1, 2, 3, . . . ) in the table of lens data correspond to signs ri, di in the lens cross section.

In the lens data of Table 1, the column of Ndj shows the refractive index of the j-th lens (j=1, 2, 3, . . . ) for e-line (wavelength is 546.07 nm). The most-object side lens is the first lens, and the number j sequentially increases toward the image side. The column of vdj shows the Abbe number of the j-th optical element for d-line (wavelength is 587.6 nm). Here, the lens data include aperture stop St. In the column of curvature radius, the sign "∞" is written for a surface corresponding to aperture stop St.

In FIG. 1 through FIG. 8, optical member PP arranged between fifth lens L5 and image plane Sim is assumed to be a cover glass, a filter or the like. In all of Examples 1 through 8, optical member PP uses a glass material with a refractive index of 1.52, and the thickness of optical member PP is 0.3 mm.

The lens data of Table 1 show, as the curvature radius of an aspherical surface, the numerical value of a curvature radius in the vicinity of an optical axis (a paraxial curvature radius). The aspherical surface data show the surface numbers of aspherical surfaces and aspherical surface coefficients related to the respective aspherical surfaces. In the aspherical surface data, "E−n" (n: integer) means "$\times 10^{-n}$", and "E+n" means "$\times 10^{n}$". Here, the aspherical surface coefficients are values of coefficients K, am m=3, 4, 5, . . . 20) in the following aspherical surface equation:

$$Zd = C \cdot h^2 / \{1 + (1 - K \cdot C^2 \cdot h^2)^{1/2}\} + \Sigma am \cdot h^m, \text{ where}$$

Zd: the depth of an aspherical surface (the length of a perpendicular from a point on the aspherical surface at height h to a plane that contacts with the vertex of the aspherical surface and is perpendicular to the optical axis), h: height (a length from the optical axis to the lens surface), C: paraxial curvature, and K, am: aspherical surface coefficients (m=3, 4, 5, . . . 20).

TABLE 1

EXAMPLE 1

LENS DATA

| SURFACE | ri | di | Nej | νdj |
|---|---|---|---|---|
| 1 | 13.985 | 1.373 | 1.77250 | 49.6 |
| 2 | 3.926 | 2.741 | | |
| *3 | −1.141 | 1.079 | 1.53391 | 55.9 |
| *4 | −4.611 | 0.435 | | |
| *5 | 3.518 | 1.907 | 1.61399 | 25.5 |
| *6 | −26.288 | 0.342 | | |
| 7 | ∞ | 0.049 | | |
| *8 | 7.402 | 1.532 | 1.53391 | 55.9 |
| *9 | −0.659 | 0.078 | | |
| *10 | −0.641 | 0.441 | 1.61399 | 25.5 |
| *11 | −1.078 | | | |

ASPHERICAL SURFACE DATA

| | SURFACE NUMBER | | | |
|---|---|---|---|---|
| | S3 | S4 | S5 | S6 |
| K | 0 | 0 | 0 | 0 |
| a3 | 3.576464E−01 | 7.706201E−01 | 3.515082E−01 | −7.947400E−02 |
| a4 | −1.016111E−01 | −6.044794E−01 | −4.246929E−01 | 3.505654E−01 |
| a5 | 8.479838E−03 | 2.856369E−01 | 3.918567E−01 | −3.154111E−01 |
| a6 | −4.623276E−04 | 4.358390E−01 | 7.984634E−02 | −1.394462E−01 |
| a7 | −3.409172E−03 | −9.495146E−02 | −4.286800E−01 | 6.793783E−01 |
| a8 | 1.625375E−03 | −3.510710E−01 | 3.279487E−01 | −4.308856E−01 |
| a9 | 1.534663E−04 | −7.505533E−02 | −1.131106E−01 | −9.795827E−02 |
| a10 | −5.995773E−05 | 9.423859E−02 | 3.871380E−02 | −2.133580E−01 |
| a11 | −1.411097E−05 | 7.736418E−02 | −3.450454E−02 | 3.899051E−01 |
| a12 | −3.829580E−06 | −1.422350E−02 | 1.047480E−02 | 1.022302E+00 |
| a13 | −1.805495E−06 | 1.923155E−02 | −6.770055E−03 | −1.881608E+00 |
| a14 | 1.156699E−06 | −1.060713E−02 | 6.295750E−03 | 8.744934E−01 |
| a15 | −5.925829E−08 | −4.498603E−03 | 4.715367E−03 | −3.435509E−01 |
| a16 | 4.734991E−08 | −8.998241E−03 | 1.533831E−03 | 6.730979E−01 |
| a17 | 4.849819E−09 | 1.707355E−03 | −3.396328E−03 | −1.036047E+00 |
| a18 | −6.436196E−09 | 1.433295E−03 | −2.127777E−04 | 3.160080E−01 |
| a19 | −9.040534E−10 | 2.016128E−03 | −7.678793E−04 | 7.705161E−01 |
| a20 | 3.473144E−10 | −9.504585E−04 | 6.405319E−04 | −4.699698E−01 |

| | SURFACE NUMBER | | | |
|---|---|---|---|---|
| | S8 | S9 | S10 | S11 |
| K | 0 | 0 | 0 | 0 |
| a3 | −1.396500E−01 | 7.025409E−02 | 1.078557E−01 | 4.663454E−02 |
| a4 | 1.352860E+00 | −1.527332E−01 | −7.438782E−01 | −7.122033E−01 |
| a5 | −7.713490E+00 | 1.910193E+00 | 2.833043E+00 | 2.475412E+00 |
| a6 | 2.783909E+01 | −4.052031E+00 | −4.603685E+00 | −4.172161E+00 |
| a7 | −6.159921E+01 | 2.020579E+00 | 2.150063E+00 | 2.085344E+00 |
| a8 | 1.205453E+02 | 1.294629E+00 | 9.379704E−01 | 1.113230E+00 |
| a9 | −3.909677E+02 | 1.255004E+00 | 1.346708E+00 | 1.276477E+00 |
| a10 | 7.844087E+02 | −2.094913E+00 | −1.532997E+00 | −1.782637E+00 |
| a11 | 1.161999E+03 | −5.908116E+00 | −6.106926E+00 | −5.795929E+00 |
| a12 | −8.651383E+03 | 8.044380E+00 | 8.112672E+00 | 7.829564E+00 |
| a13 | 1.412214E+04 | −1.729469E+00 | −1.750387E+00 | −1.789756E+00 |
| a14 | −5.230743E+03 | −7.030856E−02 | 1.419159E−01 | −1.259836E−02 |
| a15 | 5.891316E+03 | −6.305335E−01 | −8.208504E−01 | −7.646552E−01 |
| a16 | −3.904402E+04 | 1.108659E−01 | −6.985194E−02 | 6.854295E−02 |
| a17 | 1.845009E+04 | −8.579107E−01 | −5.781271E−01 | −4.924041E−01 |
| a18 | 1.008726E+05 | 1.224937E+00 | 1.032975E+00 | 9.225144E−01 |
| a19 | −1.476223E+05 | −3.756974E−01 | −4.717136E−01 | −3.442198E−01 |
| a20 | 5.987350E+04 | −2.590228E−02 | 9.186641E−02 | 1.025721E−02 |

TABLE 2

EXAMPLE 2

LENS DATA

| SURFACE | ri | di | Nej | vdj |
|---|---|---|---|---|
| 1 | 13.797 | 1.373 | 1.77250 | 49.6 |
| 2 | 3.926 | 2.881 | | |
| *3 | −1.170 | 1.079 | 1.53391 | 55.9 |
| *4 | −5.492 | 0.435 | | |
| *5 | 3.631 | 1.932 | 1.61399 | 25.5 |
| *6 | −20.410 | 0.300 | | |
| 7 | ∞ | 0.049 | | |
| *8 | 8.977 | 1.463 | 1.53391 | 55.9 |
| *9 | −0.661 | 0.078 | | |
| *10 | −0.748 | 0.441 | 1.61399 | 25.5 |
| *11 | −1.349 | | | |

ASPHERICAL SURFACE DATA

SURFACE NUMBER

| | S3 | S4 | S5 | S6 |
|---|---|---|---|---|
| K | 0 | 0 | 0 | 0 |
| a3 | 3.539595E−01 | 7.808703E−01 | 3.654480E−01 | −7.591526E−02 |
| a4 | −1.021603E−01 | −5.988237E−01 | −4.428854E−01 | 4.182345E−01 |
| a5 | 8.449642E−03 | 2.696675E−01 | 4.008681E−01 | −4.420593E−01 |
| a6 | −4.445336E−04 | 4.303864E−01 | 8.175390E−02 | −2.159074E−02 |
| a7 | −3.400541E−03 | −8.697305E−02 | −4.260987E−01 | 7.077475E−01 |
| a8 | 1.630302E−03 | −3.514382E−01 | 3.273276E−01 | −4.434090E−01 |
| a9 | 1.548438E−04 | −7.537073E−02 | −1.137188E−01 | −8.739877E−02 |
| a10 | −5.970371E−05 | 9.491822E−02 | 3.862484E−02 | −2.348962E−01 |
| a11 | −1.408423E−05 | 7.665647E−02 | −3.490593E−02 | 3.673860E−01 |
| a12 | −3.899113E−06 | −1.411874E−02 | 1.050747E−02 | 9.820261E−01 |
| a13 | −1.840153E−06 | 1.911943E−02 | −6.664320E−03 | −1.939137E+00 |
| a14 | 1.135292E−06 | −1.050423E−02 | 6.329345E−03 | 1.034345E+00 |
| a15 | −7.052008E−08 | −4.898382E−03 | 4.760936E−03 | −4.396754E−01 |
| a16 | 5.808032E−08 | −8.712266E−03 | 1.546386E−03 | 5.903603E−01 |
| a17 | 4.311106E−09 | 1.688484E−03 | −3.390084E−03 | −1.058621E+00 |
| a18 | −6.579684E−09 | 1.439408E−03 | −2.093136E−04 | 4.583074E−01 |
| a19 | −9.301822E−10 | 2.011399E−03 | −7.712580E−04 | 8.622714E−01 |
| a20 | 3.443170E−10 | −9.533207E−04 | 6.331388E−04 | −5.745744E−01 |

SURFACE NUMBER

| | S8 | S9 | S10 | S11 |
|---|---|---|---|---|
| K | 0 | 0 | 0 | 0 |
| a3 | −1.455975E−01 | 5.034487E−02 | 9.931259E−02 | 4.663454E−02 |
| a4 | 1.401127E+00 | −7.834891E−02 | −6.751775E−01 | −6.880257E−01 |
| a5 | −7.739998E+00 | 1.886268E+00 | 2.886397E+00 | 2.455138E+00 |
| a6 | 2.767881E+01 | −3.992784E+00 | −4.562947E+00 | −4.160256E+00 |
| a7 | −6.141640E+01 | 1.887307E+00 | 2.101811E+00 | 2.136864E+00 |
| a8 | 1.204464E+02 | 1.077434E+00 | 7.686593E−01 | 1.074442E+00 |
| a9 | −3.917929E+02 | 1.673703E+00 | 1.012838E+00 | 1.267042E+00 |
| a10 | 7.857260E+02 | −2.156610E+00 | −9.260374E−01 | −1.786298E+00 |
| a11 | 1.163933E+03 | −5.726527E+00 | −5.980687E+00 | −5.796457E+00 |
| a12 | −8.649674E+03 | 7.945970E+00 | 8.013340E+00 | 7.825704E+00 |
| a13 | 1.410989E+04 | −2.139901E+00 | −1.880021E+00 | −1.792560E+00 |
| a14 | −5.242394E+03 | −9.506382E−02 | −1.218706E−02 | −7.919194E−03 |
| a15 | 5.944578E+03 | −1.259505E−01 | −7.611840E−01 | −7.641308E−01 |
| a16 | −3.908654E+04 | 1.329437E−01 | −8.087464E−02 | 8.185696E−02 |
| a17 | 1.837677E+04 | −1.169882E+00 | −6.050233E−01 | −4.754929E−01 |
| a18 | 1.012467E+05 | 1.271018E+00 | 1.071267E+00 | 8.913210E−01 |
| a19 | −1.481055E+05 | −3.571733E−01 | −3.787190E−01 | −3.411988E−01 |
| a20 | 6.005159E+04 | −9.483955E−03 | 3.026210E−02 | 1.415507E−02 |

TABLE 3

| EXAMPLE 3 |
| --- |

| LENS DATA | | | | |
| --- | --- | --- | --- | --- |
| SURFACE | ri | di | Nej | vdj |
| 1 | 13.751 | 1.373 | 1.77250 | 49.6 |
| 2 | 3.926 | 2.881 | | |
| *3 | −1.193 | 1.079 | 1.53391 | 55.9 |
| *4 | −6.700 | 0.435 | | |
| *5 | 3.373 | 1.952 | 1.61399 | 25.5 |
| *6 | −26.519 | 0.300 | | |
| 7 | ∞ | 0.049 | | |
| *8 | 9.686 | 1.434 | 1.53391 | 55.9 |
| *9 | −0.665 | 0.078 | | |
| *10 | −0.736 | 0.441 | 1.61399 | 25.5 |
| *11 | −1.271 | | | |

ASPHERICAL SURFACE DATA

| | SURFACE NUMBER | | | |
| --- | --- | --- | --- | --- |
| | S3 | S4 | S5 | S6 |
| K | 0 | 0 | 0 | 0 |
| a3 | 3.528750E−01 | 7.858190E−01 | 3.624675E−01 | −7.577756E−02 |
| a4 | −1.027724E−01 | −5.977613E−01 | −4.462824E−01 | 4.075845E−01 |
| a5 | 8.525890E−03 | 2.644539E−01 | 4.044869E−01 | −4.194860E−01 |
| a6 | −4.291818E−04 | 4.285901E−01 | 8.187106E−02 | −3.787963E−02 |
| a7 | −3.400936E−03 | −8.755624E−02 | −4.255482E−01 | 6.991522E−01 |
| a8 | 1.629023E−03 | −3.518754E−01 | 3.264400E−01 | −4.382556E−01 |
| a9 | 1.543706E−04 | −7.407803E−02 | −1.138905E−01 | −6.431617E−02 |
| a10 | −5.975998E−05 | 9.448077E−02 | 3.792990E−02 | −2.200397E−01 |
| a11 | −1.407886E−05 | 7.671916E−02 | −3.467486E−02 | 3.757396E−01 |
| a12 | −3.866936E−06 | −1.406532E−02 | 1.060082E−02 | 9.848795E−01 |
| a13 | −1.835094E−06 | 1.902902E−02 | −6.623064E−03 | −1.963793E+00 |
| a14 | 1.131884E−06 | −1.043651E−02 | 6.322980E−03 | 1.010611E+00 |
| a15 | −6.939696E−08 | −4.890632E−03 | 4.793065E−03 | −4.590771E−01 |
| a16 | 5.808784E−08 | −8.696599E−03 | 1.562045E−03 | 5.269904E−01 |
| a17 | 4.279327E−09 | 1.672175E−03 | −3.363745E−03 | −1.114633E+00 |
| a18 | −6.605801E−09 | 1.439893E−03 | −2.253217E−04 | 3.013455E−01 |
| a19 | −9.244114E−10 | 2.015326E−03 | −7.604448E−04 | 1.500243E+00 |
| a20 | 3.436345E−10 | −9.555031E−04 | 6.223962E−04 | −9.165478E−01 |

| | SURFACE NUMBER | | | |
| --- | --- | --- | --- | --- |
| | S8 | S9 | S10 | S11 |
| K | 0 | 0 | 0 | 0 |
| a3 | −1.519224E−01 | 3.387135E−02 | 8.350297E−02 | 4.663454E−02 |
| a4 | 1.415819E+00 | −5.282771E−02 | −6.337962E−01 | −6.769970E−01 |
| a5 | −7.739690E+00 | 1.909825E+00 | 2.902839E+00 | 2.445728E+00 |
| a6 | 2.767716E+01 | −4.023987E+00 | −4.563562E+00 | −4.164501E+00 |
| a7 | −6.157586E+01 | 1.880916E+00 | 2.089935E+00 | 2.189921E+00 |
| a8 | 1.203542E+02 | 1.080773E+00 | 7.648836E−01 | 1.028038E+00 |
| a9 | −3.919358E+02 | 1.690765E+00 | 9.986478E−01 | 1.270538E+00 |
| a10 | 7.865038E+02 | −2.159752E+00 | −9.238030E−01 | −1.789935E+00 |
| a11 | 1.164389E+03 | −5.737750E+00 | −5.998119E+00 | −5.796278E+00 |
| a12 | −8.645452E+03 | 7.939014E+00 | 8.026614E+00 | 7.825187E+00 |
| a13 | 1.410403E+04 | −2.149209E+00 | −1.893462E+00 | −1.792557E+00 |
| a14 | −5.240310E+03 | −9.249844E−02 | −1.817119E−02 | −5.863436E−03 |
| a15 | 5.941697E+03 | −1.144137E−01 | −7.704640E−01 | −7.573736E−01 |
| a16 | −3.909321E+04 | 9.036724E−02 | −5.816305E−02 | 8.208472E−02 |
| a17 | 1.836772E+04 | −1.148644E+00 | −6.025709E−01 | −4.762212E−01 |
| a18 | 1.012382E+05 | 1.281340E+00 | 1.075507E+00 | 8.865069E−01 |
| a19 | −1.481062E+05 | −3.542013E−01 | −3.701229E−01 | −3.421460E−01 |
| a20 | 6.010184E+04 | −1.377516E−02 | 1.927957E−02 | 1.626847E−02 |

TABLE 4

| EXAMPLE 4 | | | | |
|---|---|---|---|---|
| LENS DATA | | | | |
| SURFACE | ri | di | Nej | vdj |
| 1 | 13.820 | 1.373 | 1.77250 | 49.6 |
| 2 | 3.926 | 2.532 | | |
| *3 | −1.203 | 1.079 | 1.53391 | 55.9 |
| *4 | −5.840 | 0.435 | | |
| *5 | 3.610 | 2.004 | 1.61399 | 25.5 |
| *6 | −549.752 | 0.246 | | |
| 7 | ∞ | 0.049 | | |
| *8 | 8.749 | 1.559 | 1.53391 | 55.9 |
| *9 | −0.685 | 0.080 | | |
| *10 | −0.767 | 0.441 | 1.61399 | 25.5 |
| *11 | −1.240 | | | |

ASPHERICAL SURFACE DATA

| | SURFACE NUMBER | | | |
|---|---|---|---|---|
| | S3 | S4 | S5 | S6 |
| K | 0 | 0 | 0 | 0 |
| a3 | 3.528239E−01 | 7.871707E−01 | 3.709377E−01 | −6.747215E−02 |
| a4 | −1.027089E−01 | −5.866915E−01 | −4.476078E−01 | 4.248430E−01 |
| a5 | 8.443777E−03 | 2.548925E−01 | 4.058227E−01 | −4.089012E−01 |
| a6 | −4.443869E−04 | 4.285302E−01 | 7.981317E−02 | −3.170450E−02 |
| a7 | −3.405141E−03 | −8.673852E−02 | −4.209582E−01 | 7.159112E−01 |
| a8 | 1.629517E−03 | −3.505121E−01 | 3.246846E−01 | −4.241142E−01 |
| a9 | 1.572621E−04 | −7.434330E−02 | −1.139138E−01 | −1.038036E−02 |
| a10 | −5.995026E−05 | 9.432114E−02 | 3.763748E−02 | −1.645824E−01 |
| a11 | −1.407746E−05 | 7.668187E−02 | −3.477317E−02 | 2.609583E−01 |
| a12 | −3.858858E−06 | −1.385195E−02 | 1.099434E−02 | 9.574234E−01 |
| a13 | −1.839226E−06 | 1.898585E−02 | −6.515933E−03 | −2.013487E+00 |
| a14 | 1.128370E−06 | −1.044912E−02 | 6.260058E−03 | 9.565004E−01 |
| a15 | −7.074088E−08 | −4.906149E−03 | 4.735694E−03 | −4.454686E−01 |
| a16 | 5.737447E−08 | −8.712883E−03 | 1.551375E−03 | 5.201021E−01 |
| a17 | 4.316429E−09 | 1.711487E−03 | −3.379790E−03 | −1.077566E+00 |
| a18 | −6.365026E−09 | 1.412073E−03 | −2.027941E−04 | 3.101408E−01 |
| a19 | −9.592938E−10 | 2.011982E−03 | −7.575931E−04 | 1.485990E+00 |
| a20 | 3.399841E−10 | −9.504919E−04 | 6.210215E−04 | −9.317541E−01 |

| | SURFACE NUMBER | | | |
|---|---|---|---|---|
| | S8 | S9 | S10 | S11 |
| K | 0 | 0 | 0 | 0 |
| a3 | −1.451242E−01 | 4.567079E−02 | 1.030004E−01 | 4.663454E−02 |
| a4 | 1.380315E+00 | −3.232278E−02 | −6.241143E−01 | −6.798062E−01 |
| a5 | −7.587330E+00 | 1.966645E+00 | 2.878062E+00 | 2.434198E+00 |
| a6 | 2.788068E+01 | −4.142655E+00 | −4.582913E+00 | −4.169406E+00 |
| a7 | −6.145819E+01 | 1.901703E+00 | 2.089935E+00 | 2.188735E+00 |
| a8 | 1.185564E+02 | 1.080371E+00 | 7.301002E−01 | 1.036921E+00 |
| a9 | −3.917860E+02 | 1.740564E+00 | 9.836524E−01 | 1.259764E+00 |
| a10 | 7.887811E+02 | −2.164846E+00 | −9.961103E−01 | −1.806298E+00 |
| a11 | 1.160670E+03 | −5.695600E+00 | −5.930647E+00 | −5.804193E+00 |
| a12 | −8.637423E+03 | 7.967917E+00 | 8.021326E+00 | 7.832240E+00 |
| a13 | 1.411073E+04 | −2.214012E+00 | −1.879911E+00 | −1.791759E+00 |
| a14 | −5.261047E+03 | −1.647241E−01 | −1.543738E−02 | −1.107038E−03 |
| a15 | 6.000001E+03 | −2.072213E−01 | −8.197889E−01 | −7.514075E−01 |
| a16 | −3.918723E+04 | 2.979513E−01 | −4.723724E−02 | 8.973097E−02 |
| a17 | 1.837965E+04 | −1.251498E+00 | −5.454829E−01 | −4.832081E−01 |
| a18 | 1.012366E+05 | 1.311809E+00 | 1.068657E+00 | 8.830409E−01 |
| a19 | −1.481151E+05 | −3.247293E−01 | −3.638416E−01 | −3.436322E−01 |
| a20 | 6.016779E+04 | −3.928186E−02 | 1.291888E−03 | 1.853297E−02 |

TABLE 5

EXAMPLE 5

LENS DATA

| SURFACE | ri | di | Nej | vdj |
|---|---|---|---|---|
| 1 | 14.044 | 1.373 | 1.77250 | 49.6 |
| 2 | 4.000 | 2.531 | | |
| *3 | −1.262 | 1.079 | 1.53391 | 55.9 |
| *4 | −5.428 | 0.435 | | |
| *5 | 4.799 | 2.051 | 1.61399 | 25.5 |
| *6 | 405.687 | 0.290 | | |
| 7 | ∞ | 0.049 | | |
| *8 | 6.867 | 1.631 | 1.53391 | 55.9 |
| *9 | −0.762 | 0.080 | | |
| *10 | −0.887 | 0.441 | 1.61399 | 25.5 |
| *11 | −1.279 | | | |

ASPHERICAL SURFACE DATA

SURFACE NUMBER

| | S3 | S4 | S5 | S6 |
|---|---|---|---|---|
| K | 0 | 0 | 0 | 0 |
| a3 | 3.517460E−01 | 7.998652E−01 | 3.752971E−01 | −6.554253E−02 |
| a4 | −1.043551E−01 | −5.747079E−01 | −4.221723E−01 | 3.762600E−01 |
| a5 | 8.075871E−03 | 2.505510E−01 | 3.933647E−01 | −4.031976E−01 |
| a6 | −3.246340E−04 | 4.316264E−01 | 7.343820E−02 | 3.447437E−03 |
| a7 | −3.391957E−03 | −8.629798E−02 | −4.226439E−01 | 7.732548E−01 |
| a8 | 1.636731E−03 | −3.534020E−01 | 3.288067E−01 | −5.754362E−01 |
| a9 | 1.566353E−04 | −7.423862E−02 | −1.113689E−01 | −6.684742E−02 |
| a10 | −6.025618E−05 | 9.502495E−02 | 3.835654E−02 | −2.103687E−01 |
| a11 | −1.393241E−05 | 7.670111E−02 | −3.581056E−02 | 1.981708E−01 |
| a12 | −3.946482E−06 | −1.372719E−02 | 1.060292E−02 | 8.791662E−01 |
| a13 | −1.803564E−06 | 1.917962E−02 | −6.622284E−03 | −1.577738E+00 |
| a14 | 1.119655E−06 | −1.044754E−02 | 6.143874E−03 | 8.027891E−01 |
| a15 | −6.934616E−08 | −4.831869E−03 | 4.714941E−03 | −3.173624E−01 |
| a16 | 5.712386E−08 | −8.745329E−03 | 1.527680E−03 | 7.169571E−01 |
| a17 | 4.175144E−09 | 1.630074E−03 | −3.388350E−03 | −1.069141E+00 |
| a18 | −6.417671E−09 | 1.379726E−03 | −1.806104E−04 | 2.621830E−01 |
| a19 | −9.133102E−10 | 2.021259E−03 | −6.985975E−04 | 1.184311E+00 |
| a20 | 3.339660E−10 | −9.379156E−04 | 5.920708E−04 | −7.895090E−01 |

SURFACE NUMBER

| | S8 | S9 | S10 | S11 |
|---|---|---|---|---|
| K | 0 | 0 | 0 | 0 |
| a3 | −1.569576E−01 | −5.785700E−02 | 2.199658E−02 | 4.663454E−02 |
| a4 | 1.445080E+00 | 7.307219E−02 | −5.522280E−01 | −6.283695E−01 |
| a5 | −7.973389E+00 | 1.938968E+00 | 2.890316E+00 | 2.370031E+00 |
| a6 | 2.822992E+01 | −4.242168E+00 | −4.650883E+00 | −4.179706E+00 |
| a7 | −6.078376E+01 | 1.885186E+00 | 1.986147E+00 | 2.223874E+00 |
| a8 | 1.189684E+02 | 1.099570E+00 | 7.016923E−01 | 1.051424E+00 |
| a9 | −3.967461E+02 | 1.789500E+00 | 1.174900E+00 | 1.271725E+00 |
| a10 | 7.884569E+02 | −2.135554E+00 | −1.028083E+00 | −1.825452E+00 |
| a11 | 1.169903E+03 | −5.663039E+00 | −5.814384E+00 | −5.829268E+00 |
| a12 | −8.621938E+03 | 8.123190E+00 | 8.030797E+00 | 7.821014E+00 |
| a13 | 1.405177E+04 | −2.312655E+00 | −1.868411E+00 | −1.794051E+00 |
| a14 | −5.228863E+03 | −2.235316E−01 | −1.698062E−01 | 4.448708E−03 |
| a15 | 6.095878E+03 | −2.785967E−01 | −8.828839E−01 | −7.104149E−01 |
| a16 | −3.928297E+04 | 2.686292E−01 | −7.518570E−02 | 8.802676E−02 |
| a17 | 1.828881E+04 | −1.281496E+00 | −5.265268E−01 | −4.916333E−01 |
| a18 | 1.014150E+05 | 1.424467E+00 | 1.128666E+00 | 8.717200E−01 |
| a19 | −1.483395E+05 | −2.884570E−01 | −2.628355E−01 | −3.514156E−01 |
| a20 | 6.032913E+04 | −8.769461E−02 | −7.904207E−02 | 2.708975E−02 |

TABLE 6

EXAMPLE 6

LENS DATA

| SURFACE | ri | di | Nej | vdj |
|---|---|---|---|---|
| 1 | 14.408 | 1.400 | 1.77250 | 49.6 |
| 2 | 4.000 | 2.475 | | |
| *3 | −1.278 | 1.079 | 1.53391 | 55.9 |
| *4 | −4.751 | 0.435 | | |
| *5 | 5.334 | 1.916 | 1.63350 | 23.6 |
| *6 | 45.812 | 0.356 | | |
| 7 | ∞ | 0.049 | | |
| *8 | 6.161 | 1.589 | 1.53391 | 55.9 |
| *9 | −0.740 | 0.080 | | |
| *10 | −0.900 | 0.441 | 1.63350 | 23.6 |
| *11 | −1.361 | | | |

ASPHERICAL SURFACE DATA

SURFACE NUMBER

| | S3 | S4 | S5 | S6 |
|---|---|---|---|---|
| K | 0 | 0 | 0 | 0 |
| a3 | 3.524498E−01 | 7.989919E−01 | 3.651150E−01 | −4.655623E−02 |
| a4 | −1.044993E−01 | −5.663033E−01 | −4.130300E−01 | 3.429548E−01 |
| a5 | 8.048027E−03 | 2.382772E−01 | 3.849733E−01 | −4.530138E−01 |
| a6 | −3.174982E−04 | 4.323168E−01 | 7.163680E−02 | 3.098542E−02 |
| a7 | −3.391149E−03 | −8.412983E−02 | −4.238448E−01 | 8.003525E−01 |
| a8 | 1.635585E−03 | −3.533945E−01 | 3.310835E−01 | −5.792977E−01 |
| a9 | 1.552534E−04 | −7.439558E−02 | −1.108394E−01 | −6.312032E−02 |
| a10 | −6.014004E−05 | 9.539393E−02 | 3.830496E−02 | −2.349675E−01 |
| a11 | −1.387944E−05 | 7.700832E−02 | −3.550636E−02 | 1.912835E−01 |
| a12 | −4.003721E−06 | −1.350166E−02 | 1.008123E−02 | 9.258604E−01 |
| a13 | −1.737582E−06 | 1.908142E−02 | −6.452826E−03 | −1.532484E+00 |
| a14 | 1.118464E−06 | −1.050076E−02 | 6.189673E−03 | 9.534326E−01 |
| a15 | −7.032009E−08 | −4.835253E−03 | 4.621763E−03 | −5.898509E−01 |
| a16 | 5.981000E−08 | −8.781092E−03 | 1.551225E−03 | 6.925632E−01 |
| a17 | 1.546138E−09 | 1.622368E−03 | −3.391123E−03 | −1.022029E+00 |
| a18 | −6.107714E−09 | 1.372453E−03 | −1.935510E−04 | 2.165629E−01 |
| a19 | −8.779158E−10 | 2.029179E−03 | −6.763937E−04 | 1.206105E+00 |
| a20 | 3.396878E−10 | −9.366952E−04 | 5.831153E−04 | −7.387666E−01 |

SURFACE NUMBER

| | S8 | S9 | S10 | S11 |
|---|---|---|---|---|
| K | 0 | 0 | 0 | 0 |
| a3 | −1.623173E−01 | −9.111810E−02 | −4.879146E−03 | 4.663454E−02 |
| a4 | 1.512853E+00 | 7.762031E−02 | −5.097085E−01 | −6.308846E−01 |
| a5 | −8.157718E+00 | 1.976173E+00 | 2.813067E+00 | 2.349505E+00 |
| a6 | 2.806116E+01 | −4.237071E+00 | −4.679813E+00 | −4.187304E+00 |
| a7 | −6.061270E+01 | 1.846252E+00 | 1.983409E+00 | 2.228751E+00 |
| a8 | 1.196912E+02 | 1.131017E+00 | 7.826555E−01 | 1.040340E+00 |
| a9 | −4.003859E+02 | 1.722891E+00 | 1.218952E+00 | 1.295411E+00 |
| a10 | 7.954933E+02 | −2.135716E+00 | −1.020532E+00 | −1.816854E+00 |
| a11 | 1.175057E+03 | −5.591724E+00 | −5.820776E+00 | −5.828777E+00 |
| a12 | −8.629280E+03 | 8.177616E+00 | 8.005213E+00 | 7.809661E+00 |
| a13 | 1.404758E+04 | −2.360695E+00 | −1.893193E+00 | −1.798908E+00 |
| a14 | −5.284112E+03 | −2.254872E−01 | −1.963544E−01 | 1.920924E−03 |
| a15 | 6.189004E+03 | −3.138562E−01 | −8.770561E−01 | −7.094354E−01 |
| a16 | −3.938952E+04 | 2.629516E−01 | −7.417069E−02 | 9.144957E−02 |
| a17 | 1.832155E+04 | −1.269368E+00 | −5.162215E−01 | −4.901532E−01 |
| a18 | 1.017780E+05 | 1.417278E+00 | 1.142494E+00 | 8.734231E−01 |
| a19 | −1.487501E+05 | −2.698764E−01 | −2.575360E−01 | −3.563668E−01 |
| a20 | 6.038908E+04 | −9.408334E−02 | −8.922199E−02 | 2.907484E−02 |

TABLE 7

EXAMPLE 7

LENS DATA

| SURFACE | ri | di | Nej | vdj |
|---|---|---|---|---|
| 1 | 14.193 | 1.400 | 1.77250 | 49.6 |
| 2 | 4.000 | 2.464 | | |
| *3 | −1.263 | 1.079 | 1.53391 | 55.9 |
| *4 | −4.310 | 0.435 | | |
| *5 | 5.482 | 1.826 | 1.63350 | 23.6 |
| *6 | −34.903 | 0.338 | | |
| 7 | ∞ | 0.049 | | |
| *8 | 13.493 | 1.482 | 1.53391 | 55.9 |
| *9 | −0.727 | 0.080 | | |
| *10 | −0.946 | 0.441 | 1.63350 | 23.6 |
| *11 | −1.541 | | | |

ASPHERICAL SURFACE DATA

SURFACE NUMBER

| | S3 | S4 | S5 | S6 |
|---|---|---|---|---|
| K | 0 | 0 | 0 | 0 |
| a3 | 3.536316E−01 | 7.880292E−01 | 3.636482E−01 | −5.450196E−02 |
| a4 | −1.043745E−01 | −5.517757E−01 | −4.138785E−01 | 3.517165E−01 |
| a5 | 8.086207E−03 | 2.398230E−01 | 3.818633E−01 | −4.796000E−01 |
| a6 | −2.994103E−04 | 4.323625E−01 | 7.144213E−02 | 3.960320E−02 |
| a7 | −3.388562E−03 | −8.420763E−02 | −4.238731E−01 | 8.223170E−01 |
| a8 | 1.634511E−03 | −3.546101E−01 | 3.312432E−01 | −6.193223E−01 |
| a9 | 1.556796E−04 | −7.463500E−02 | −1.106446E−01 | −1.075655E−01 |
| a10 | −6.044533E−05 | 9.537100E−02 | 3.828044E−02 | −2.890252E−01 |
| a11 | −1.396756E−05 | 7.702696E−02 | −3.584384E−02 | 2.628614E−01 |
| a12 | −4.027163E−06 | −1.354858E−02 | 1.000754E−02 | 1.006265E+00 |
| a13 | −1.754572E−06 | 1.908346E−02 | −6.363856E−03 | −1.490531E+00 |
| a14 | 1.128860E−06 | −1.051568E−02 | 6.127168E−03 | 9.900953E−01 |
| a15 | −6.998458E−08 | −4.830924E−03 | 4.606509E−03 | −5.221199E−01 |
| a16 | 6.003370E−08 | −8.793153E−03 | 1.539101E−03 | 6.256196E−01 |
| a17 | 1.538872E−09 | 1.612821E−03 | −3.392311E−03 | −1.123885E+00 |
| a18 | −6.176671E−09 | 1.373416E−03 | −1.903847E−04 | 7.472199E−02 |
| a19 | −8.764735E−10 | 2.031628E−03 | −6.727749E−04 | 1.187511E+00 |
| a20 | 3.414674E−10 | −9.350254E−04 | 5.836051E−04 | −6.048059E−01 |

SURFACE NUMBER

| | S8 | S9 | S10 | S11 |
|---|---|---|---|---|
| K | 0 | 0 | 0 | 0 |
| a3 | −1.986025E−01 | −1.132695E−01 | −3.514693E−02 | 4.663454E−02 |
| a4 | 1.641797E+00 | 5.135863E−02 | −4.792778E−01 | −6.440957E−01 |
| a5 | −8.266542E+00 | 2.054769E+00 | 2.763917E+00 | 2.319567E+00 |
| a6 | 2.777359E+01 | −4.239523E+00 | −4.751269E+00 | −4.192740E+00 |
| a7 | −6.062212E+01 | 1.768389E+00 | 2.019805E+00 | 2.238442E+00 |
| a8 | 1.205466E+02 | 1.066157E+00 | 7.727097E−01 | 1.040022E+00 |
| a9 | −4.016043E+02 | 1.730008E+00 | 1.243217E+00 | 1.301277E+00 |
| a10 | 7.982730E+02 | −2.107178E+00 | −9.996106E−01 | −1.811002E+00 |
| a11 | 1.177784E+03 | −5.518539E+00 | −5.804124E+00 | −5.828996E+00 |
| a12 | −8.627874E+03 | 8.331675E+00 | 8.051564E+00 | 7.806956E+00 |
| a13 | 1.401829E+04 | −2.436742E+00 | −1.893387E+00 | −1.810157E+00 |
| a14 | −5.285169E+03 | −2.776904E−01 | −2.602873E−01 | 3.764943E−03 |
| a15 | 6.222585E+03 | −4.294121E−01 | −8.897787E−01 | −7.062445E−01 |
| a16 | −3.942633E+04 | 2.175910E−01 | −6.209887E−02 | 9.343433E−02 |
| a17 | 1.833709E+04 | −1.225244E+00 | −5.158942E−01 | −4.893234E−01 |
| a18 | 1.019349E+05 | 1.504704E+00 | 1.147729E+00 | 8.732742E−01 |
| a19 | −1.488307E+05 | −2.400129E−01 | −2.469541E−01 | −3.584106E−01 |
| a20 | 6.029847E+04 | −1.425801E−01 | −9.647233E−02 | 2.993228E−02 |

TABLE 8

EXAMPLE 8

LENS DATA

| SURFACE | ri | di | Nej | vdj |
|---|---|---|---|---|
| 1 | 13.743 | 1.400 | 1.77250 | 49.6 |
| 2 | 4.000 | 2.429 | | |
| *3 | −1.287 | 1.079 | 1.53391 | 55.9 |
| *4 | −4.814 | 0.435 | | |
| *5 | 5.404 | 1.838 | 1.63350 | 23.6 |
| *6 | −26.456 | 0.284 | | |
| 7 | ∞ | 0.049 | | |
| *8 | 22.755 | 1.455 | 1.53391 | 55.9 |
| *9 | −0.715 | 0.080 | | |
| *10 | −0.940 | 0.441 | 1.63350 | 23.6 |
| *11 | −1.566 | | | |

ASPHERICAL SURFACE DATA

SURFACE NUMBER

| | S3 | S4 | S5 | S6 |
|---|---|---|---|---|
| K | 0 | 0 | 0 | 0 |
| a3 | 3.506778E−01 | 7.772335E−01 | 3.582847E−01 | −4.414017E−02 |
| a4 | −1.042539E−01 | −5.575118E−01 | −4.154740E−01 | 3.508350E−01 |
| a5 | 8.140741E−03 | 2.409301E−01 | 3.818183E−01 | −4.688635E−01 |
| a6 | −2.844764E−04 | 4.322594E−01 | 7.063641E−02 | 4.316327E−01 |
| a7 | −3.385726E−03 | −8.380970E−02 | −4.236176E−01 | 8.090826E−01 |
| a8 | 1.634681E−03 | −3.554378E−01 | 3.307002E−01 | −6.351442E−01 |
| a9 | 1.556112E−04 | −7.448361E−02 | −1.107577E−01 | −1.171813E−01 |
| a10 | −6.041497E−05 | 9.545300E−02 | 3.831190E−02 | −3.012934E−01 |
| a11 | −1.400335E−05 | 7.711454E−02 | −3.607236E−02 | 2.433253E−01 |
| a12 | −4.049491E−06 | −1.361338E−02 | 1.008879E−02 | 1.019471E+00 |
| a13 | −1.751262E−06 | 1.908552E−02 | −6.373578E−03 | −1.474077E+00 |
| a14 | 1.124692E−06 | −1.052616E−02 | 6.130714E−03 | 1.003956E+00 |
| a15 | −6.941398E−08 | −4.828610E−03 | 4.616366E−03 | −5.076498E−01 |
| a16 | 6.024756E−08 | −8.792558E−03 | 1.541588E−03 | 6.215624E−01 |
| a17 | 1.628210E−09 | 1.610212E−03 | −3.389529E−03 | −1.111912E+00 |
| a18 | −6.154272E−09 | 1.372216E−03 | −1.916274E−04 | 6.300090E−02 |
| a19 | −8.811687E−10 | 2.031670E−03 | −6.737538E−04 | 1.163022E+00 |
| a20 | 3.367721E−10 | −9.343571E−04 | 5.821869E−04 | −5.894363E−01 |

SURFACE NUMBER

| | S8 | S9 | S10 | S11 |
|---|---|---|---|---|
| K | 0 | 0 | 0 | 0 |
| a3 | −1.888038E−01 | −1.127371E−01 | −2.847947E−02 | 4.663454E−02 |
| a4 | 1.630949E+00 | 7.311934E−02 | −4.164898E−01 | −6.237245E−01 |
| a5 | −8.260487E+00 | 2.059160E+00 | 2.769265E+00 | 2.307714E+00 |
| a6 | 2.784732E+01 | −4.245308E+00 | −4.770518E+00 | −4.225150E+00 |
| a7 | −6.111454E+01 | 1.713799E+00 | 1.837298E+00 | 2.246912E+00 |
| a8 | 1.208860E+02 | 1.007759E+00 | 7.590351E−01 | 1.044298E+00 |
| a9 | −4.015334E+02 | 1.756595E+00 | 1.221748E+00 | 1.309595E+00 |
| a10 | 7.985542E+02 | −2.067003E+00 | −9.949671E−01 | −1.834193E+00 |
| a11 | 1.178196E+03 | −5.456405E+00 | −5.814775E+00 | −5.829078E+00 |
| a12 | −8.630859E+03 | 8.346115E+00 | 8.151069E+00 | 7.803273E+00 |
| a13 | 1.401975E+04 | −2.460936E+00 | −1.883252E+00 | −1.811998E+00 |
| a14 | −5.282007E+03 | −3.114714E−01 | −1.926864E−01 | 3.335478E−03 |
| a15 | 6.234216E+03 | −4.853828E−01 | −8.971702E−01 | −6.973534E−01 |
| a16 | −3.944046E+04 | 1.936234E−01 | −8.255051E−02 | 9.582838E−02 |
| a17 | 1.830284E+04 | −1.305738E+00 | −5.513875E−01 | −4.865091E−01 |
| a18 | 1.019791E+05 | 1.668648E+00 | 1.138204E+00 | 8.683002E−01 |
| a19 | −1.488147E+05 | −1.922452E−01 | −2.421398E−01 | −3.587166E−01 |
| a20 | 6.026590E+04 | −2.124734E−01 | −9.083226E−02 | 3.042821E−02 |

In Examples 1 through 8, the material of first lens L1 is optical glass, and both surfaces of first lens L1 are spherical. Therefore, first lens L1 has excellent weather resistance characteristics, and first lens L1 is not easily damaged by earth and sand, or the like. Further, it is possible to produce first lens L1 relatively at low cost. In Examples 1 through 8, cycloolefin-based plastic is selected as the material of second lens L2 and fourth lens L4. Further, polycarbonate-based plastic is selected as the material of third lens L3 and fifth lens L5. Accordingly, materials having low water absorption characteristics are selected to minimize a change in performance by absorption of water.

Table 9 shows various data and values corresponding to conditional formulas (1) through (13) in the imaging lenses of Examples 1 through 8. In Examples 1 through 8, e-line is a reference wavelength, and Table 9 shows values for the reference wavelength.

In Table 9, f is a focal length of an entire system, and Bf is a distance (corresponding to back focus) on an optical axis from the image-side surface of the most-image-side lens to an image plane, and L is a distance on the optical axis from the object-side surface of first lens L1 to image plane Sim, and 2ω is a full angle of view. Bf is a distance in air. Specifically, Bf shows a value calculated by using an equivalent length in air, as the thickness of optical member PP. Similarly, a distance in air is used for a back focus portion of L. As Table 9 shows, all of Examples 1 through 8 satisfy conditional formulas (1) through (13).

tortion is calculated by using, as reference, an image height based on equidistant projection. That is because the imaging lenses of Examples 1 through 8 are designed so that images in peripheral portions are large, compared with a lens designed in such a manner to suppress distortion at an image height based on equidistant projection.

As these data show, each of the imaging lenses of Examples 1 through 8 consists of five lenses, which are a small number of lenses, and the size is small, and the cost is low. Further, it is possible to achieve an extremely wide full angle of view of about 220 degrees. Further, F-number is 2.0, which is small.

TABLE 9

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
| --- | --- | --- | --- | --- | --- | --- | --- | --- |
| Fno. | 2.0 | 2.0 | 2.0 | 2.0 | 2.0 | 2.0 | 2.0 | 2.0 |
| f | 0.910 | 0.899 | 0.887 | 0.890 | 0.863 | 0.886 | 0.950 | 0.969 |
| Bf | 1.982 | 1.987 | 1.995 | 1.987 | 1.991 | 2.005 | 2.095 | 2.145 |
| L | 11.960 | 12.020 | 12.018 | 11.787 | 11.953 | 11.825 | 11.689 | 11.636 |
| 2ω | 220.8* | 223.8* | 224.2* | 219.2* | 219.0* | 217.6* | 218.6* | 220.4* |
| $f_{34}/L$ | 0.133 | 0.129 | 0.132 | 0.136 | 0.138 | 0.133 | 0.131 | 0.130 |
| $d_{1-4}/L$ | 0.434 | 0.444 | 0.444 | 0.423 | 0.417 | 0.419 | 0.423 | 0.422 |
| $d_{3-11}/L$ | 0.490 | 0.481 | 0.480 | 0.500 | 0.507 | 0.503 | 0.490 | 0.487 |
| $d_{4-5}/L$ | 0.036 | 0.036 | 0.036 | 0.037 | 0.036 | 0.037 | 0.037 | 0.037 |
| $d_{6-8}/L$ | 0.033 | 0.029 | 0.029 | 0.025 | 0.028 | 0.034 | 0.033 | 0.029 |
| $L/r_3$ | −10.479 | −10.272 | −10.078 | −9.797 | −9.474 | −9.254 | −9.257 | −9.040 |
| $d_{4-5}/f$ | 0.479 | 0.484 | 0.491 | 0.489 | 0.504 | 0.491 | 0.458 | 0.449 |
| $d_{10}/f$ | 0.485 | 0.491 | 0.497 | 0.496 | 0.511 | 0.498 | 0.464 | 0.455 |
| $f_3/f$ | 5.640 | 5.711 | 5.582 | 6.514 | 9.060 | 10.450 | 7.930 | 7.402 |
| Bf/f | 2.178 | 2.211 | 2.249 | 2.234 | 2.306 | 2.262 | 2.204 | 2.213 |
| $r_{10}/f$ | −0.704 | −0.832 | −0.830 | −0.862 | −1.027 | −1.016 | −0.996 | −0.970 |
| L/f | 13.145 | 13.374 | 13.546 | 13.249 | 13.843 | 13.339 | 12.298 | 12.004 |
| $(r_8 + r_9)/(r_8 - r_9)$ | 0.837 | 0.863 | 0.871 | 0.855 | 0.800 | 0.786 | 0.898 | 0.939 |

In each of the tables, numerical values are rounded at predetermined digits. As the unit of each numerical value, "°" is used for angle, and "mm" is used for length. However, these units are only examples. Since an optical system can be used by proportionally enlarging or reducing the optical system, other appropriate units may be used.

Figure 9:
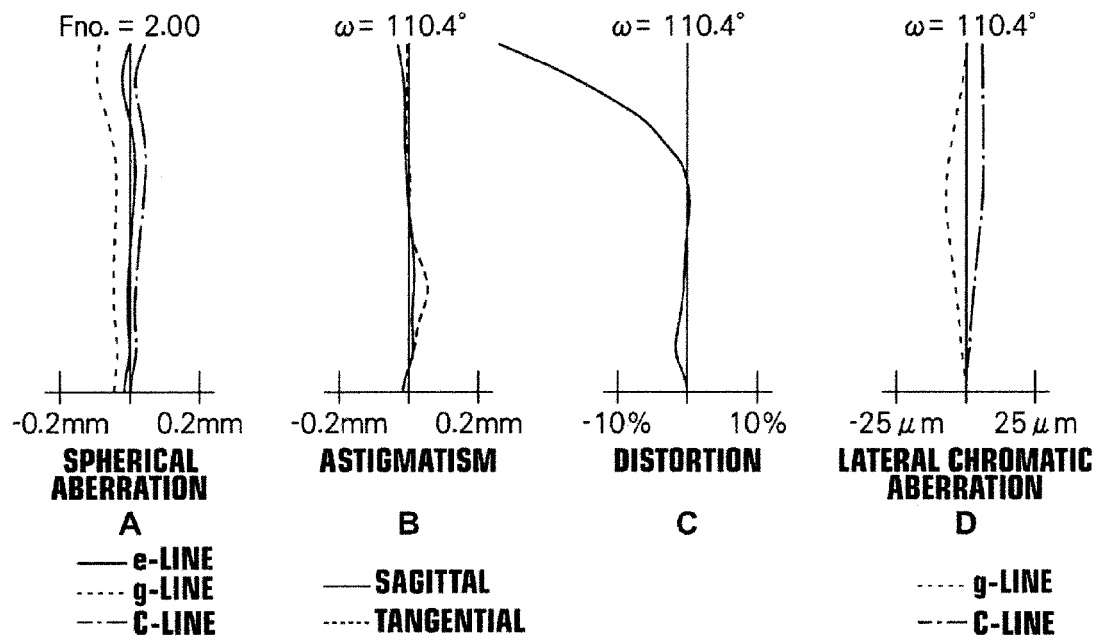
FIG. 9, Sections A through G illustrate aberration diagrams of the imaging lens in Example 1 of the present invention.
Figure 9:
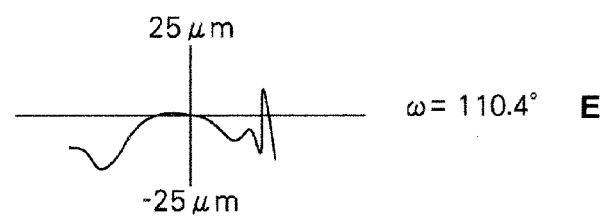
Figure 9:
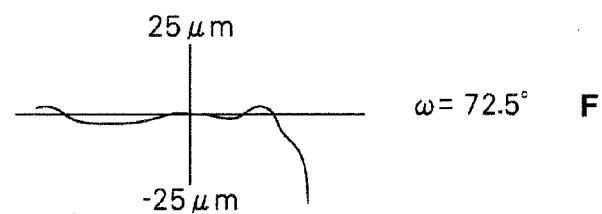
Figure 9:
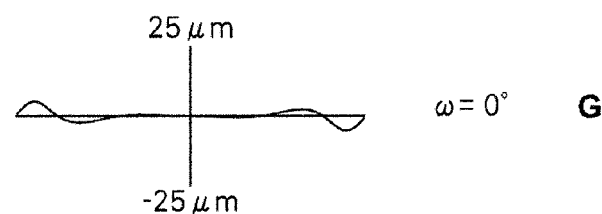

FIG. 9, Sections A through G illustrate aberration diagrams of the imaging lens of Example 1. FIG. 9, Sections A through D illustrate a spherical aberration, astigmatism, distortion (distortion aberration), and a lateral chromatic aberration (a chromatic aberration of magnification), respectively. FIG. 9, Sections E through G illustrate lateral aberrations in a tangential direction for each half angle of view. Each aberration diagram illustrates aberrations when e-line is a reference wavelength. However, the diagram of a spherical aberration and the diagram of a lateral chromatic aberration illustrate aberrations also for g-line (wavelength is 436 nm) and C-line (wavelength is 656.27 nm). In the diagram of a spherical aberration, Fno. represents F-number, and in the other diagrams, ω represents a half angle of view.

Figure 10:
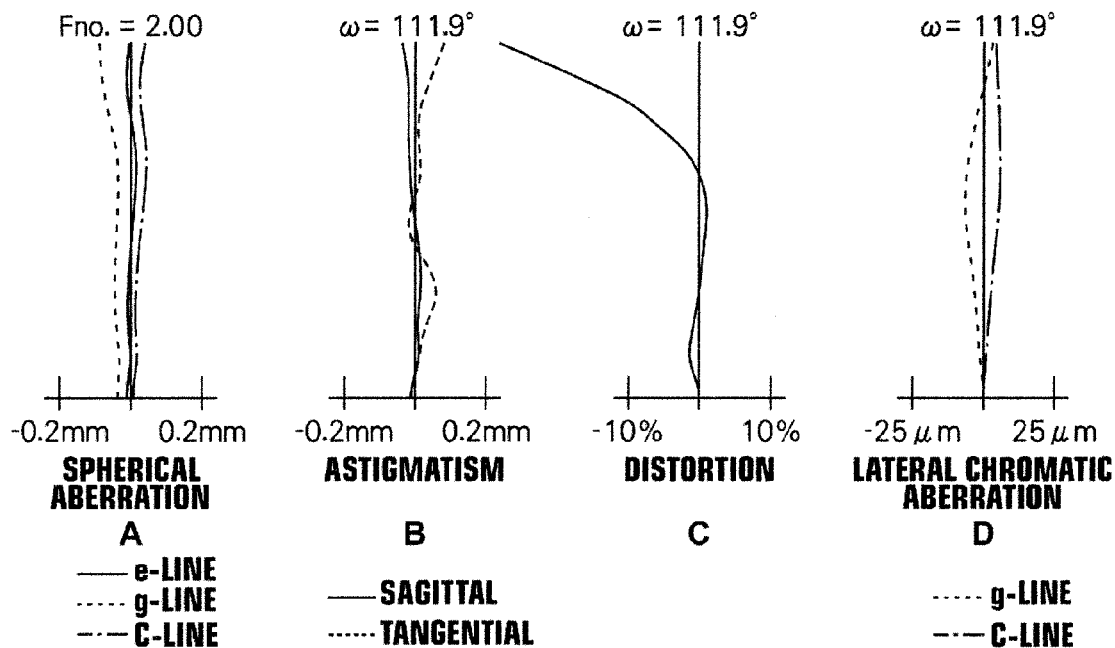
FIG. 10, Sections A through G illustrate aberration diagrams of the imaging lens in Example 2 of the present invention.
Figure 10:
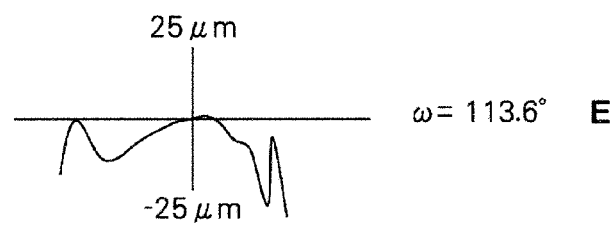
Figure 10:
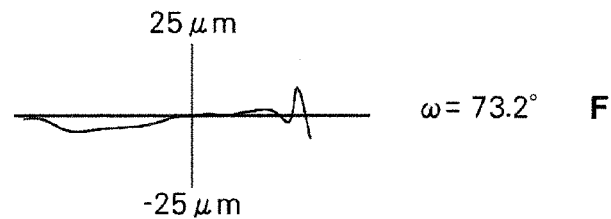
Figure 10:
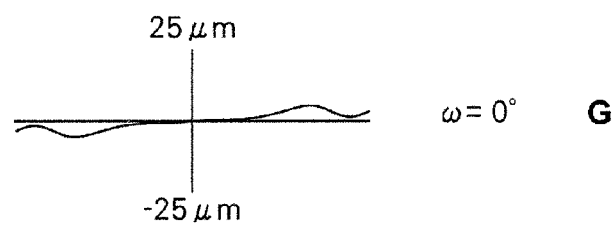
Figure 11:
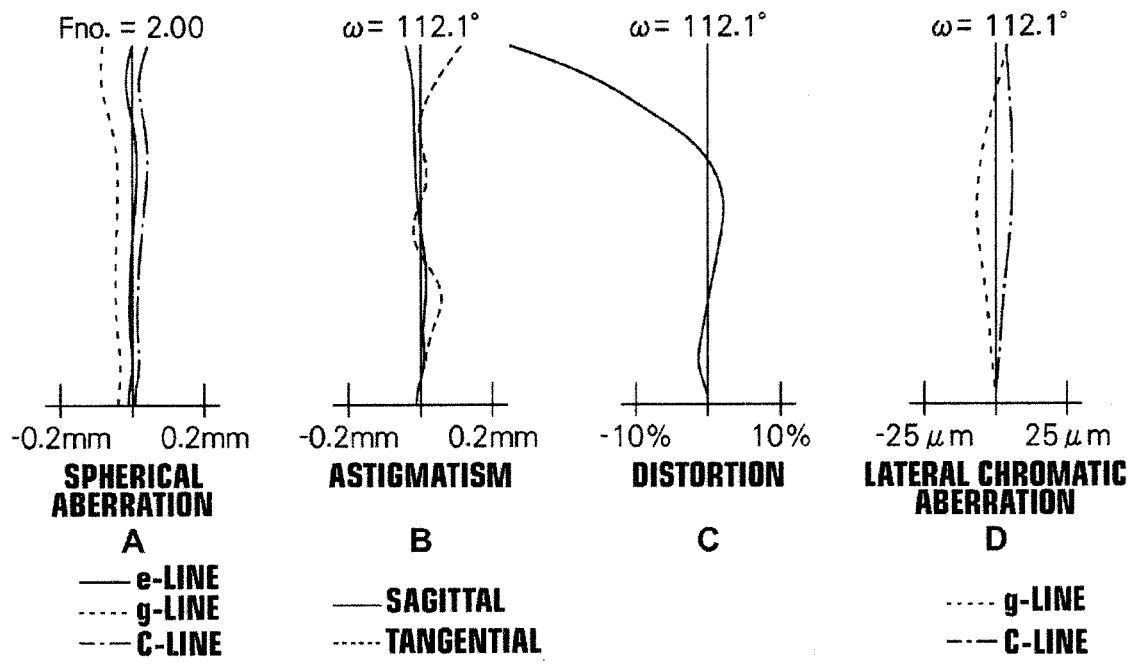
FIG. 11, Sections A through G illustrate aberration diagrams of the imaging lens in Example 3 of the present invention.
Figure 11:
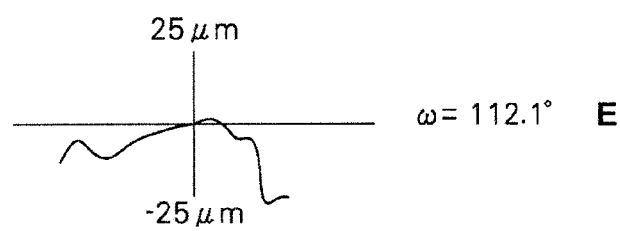
Figure 11:
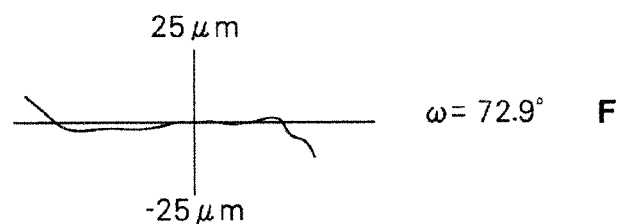
Figure 11:
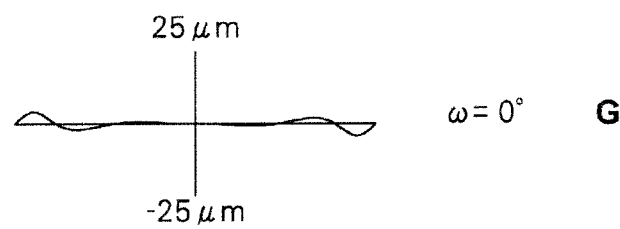
Figure 12:
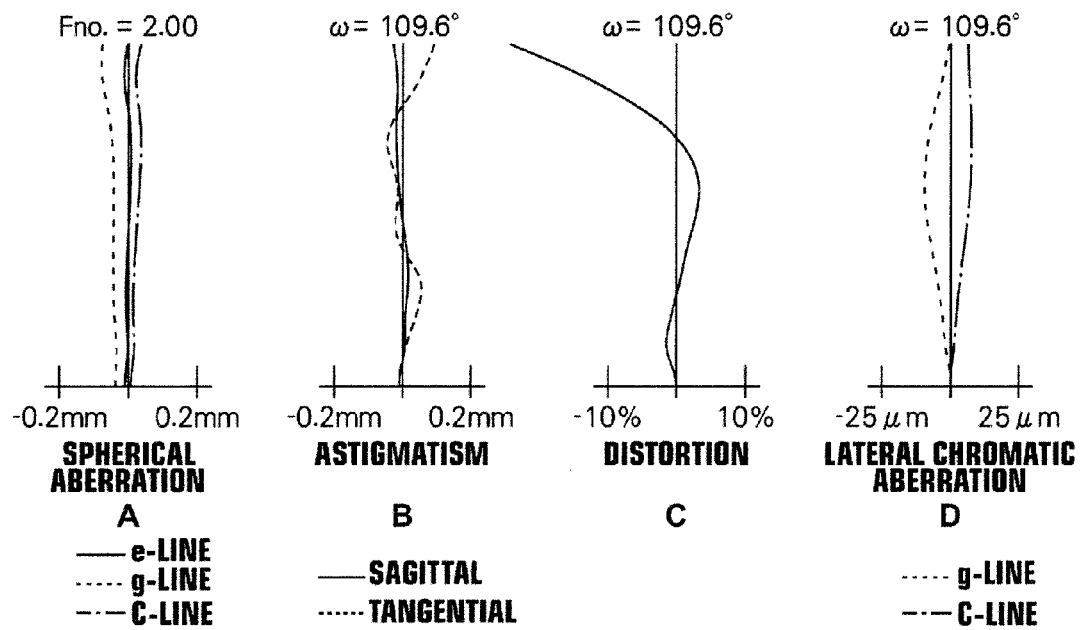
FIG. 12, Sections A through G illustrate aberration diagrams of the imaging lens in Example 4 of the present invention.
Figure 12:
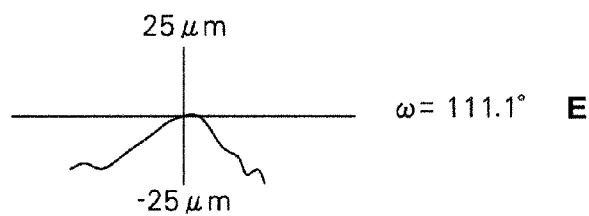
Figure 12:
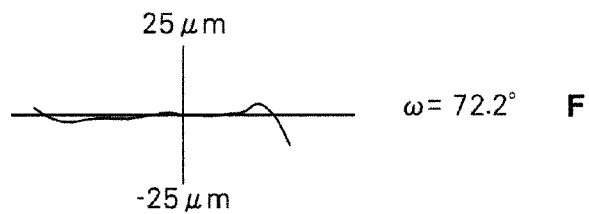
Figure 12:
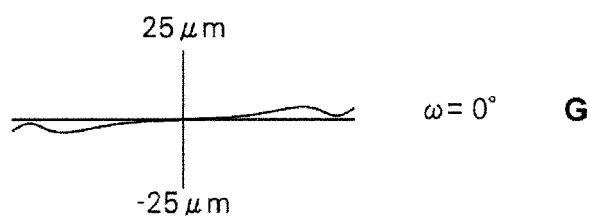
Figure 13:
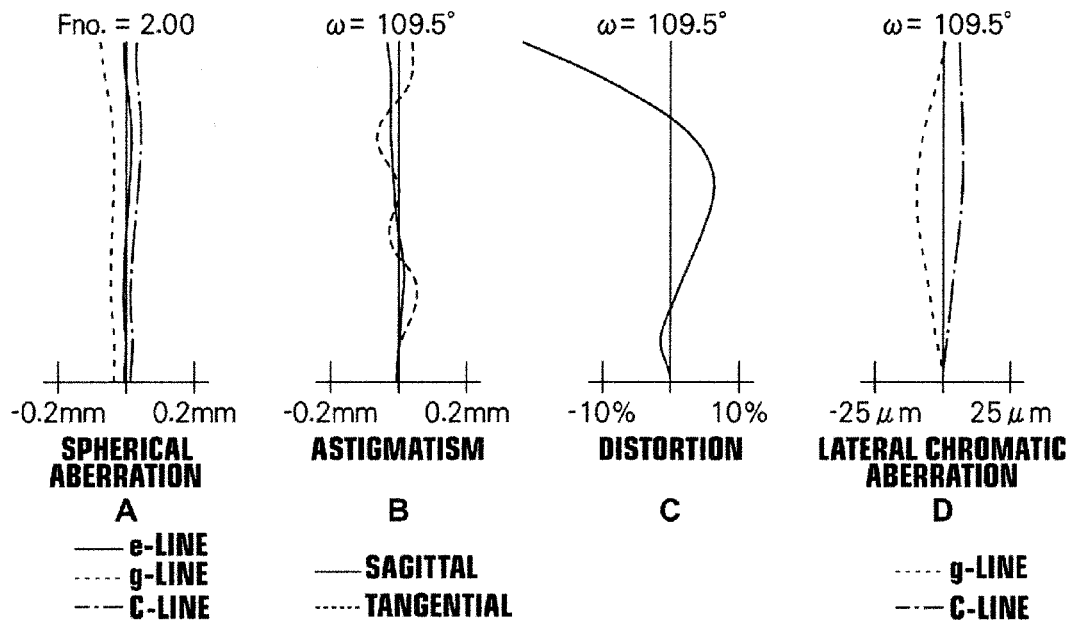
FIG. 13, Sections A through G illustrate aberration diagrams of the imaging lens in Example 5 of the present invention.
Figure 13:
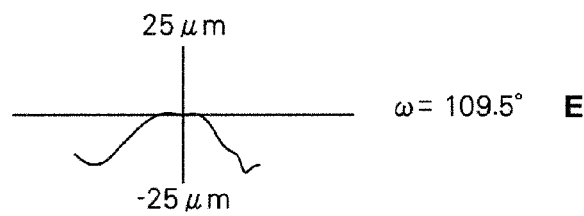
Figure 13:
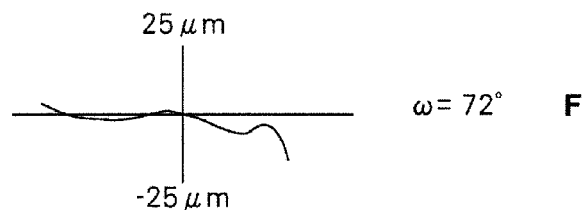
Figure 13:
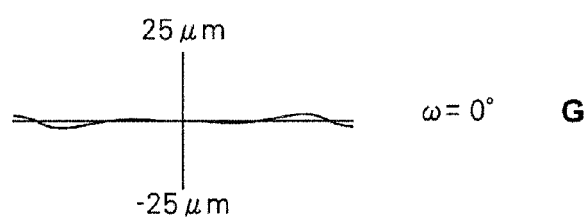
Figure 14:
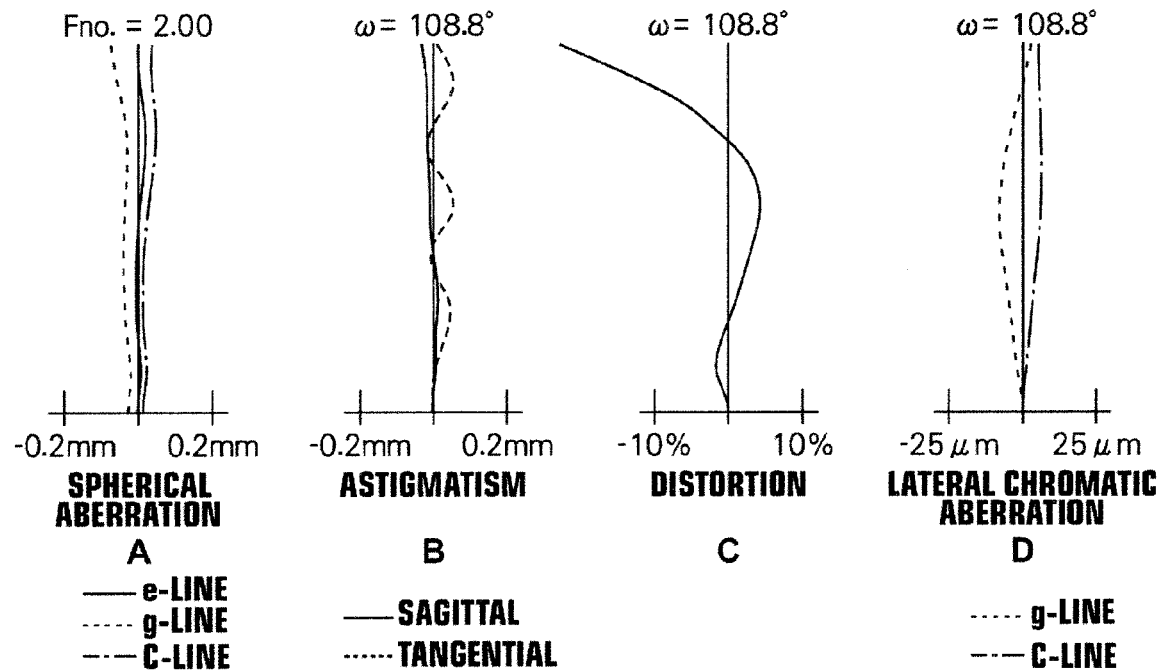
FIG. 14, Sections A through G illustrate aberration diagrams of the imaging lens in Example 6 of the present invention.
Figure 14:
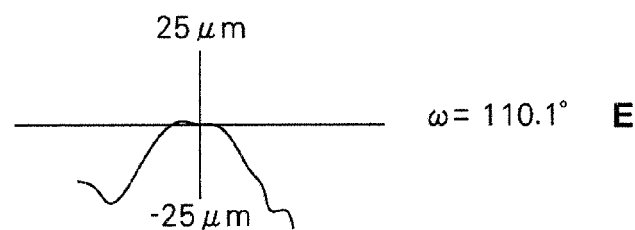
Figure 14:
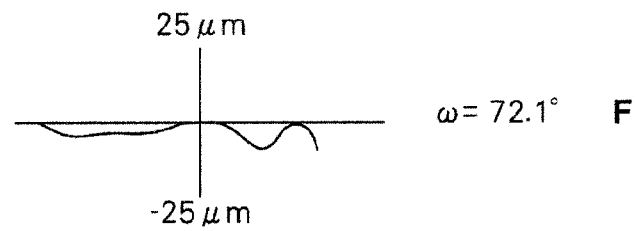
Figure 14:
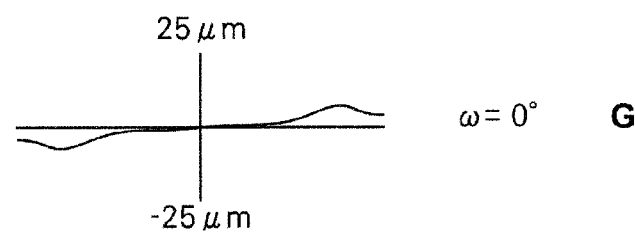
Figure 15:
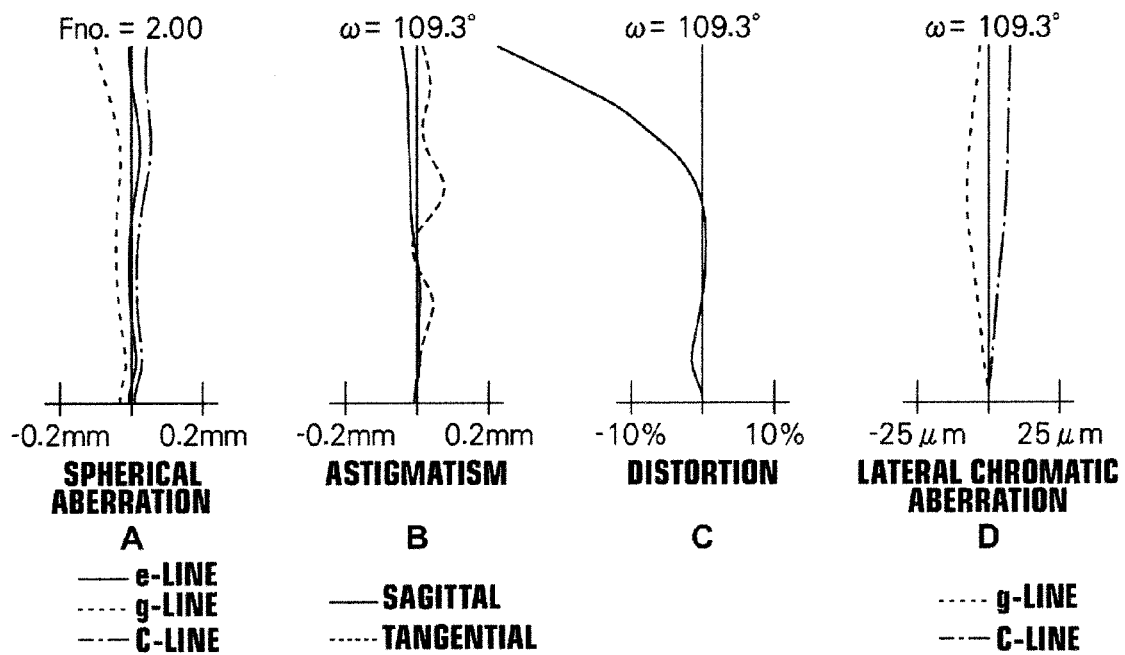
FIG. 15, Sections A through G illustrate aberration diagrams of the imaging lens in Example 7 of the present invention.
Figure 15:
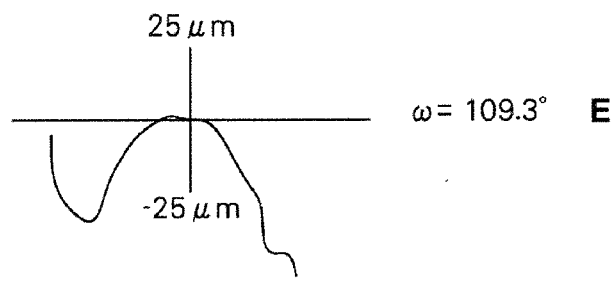
Figure 15:
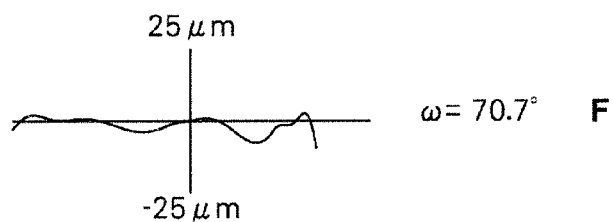
Figure 15:
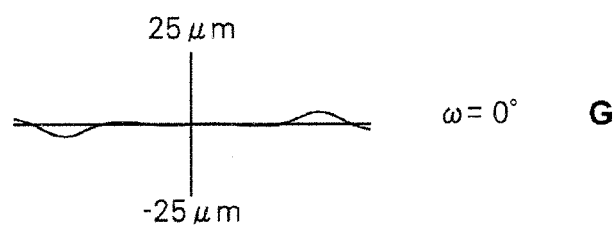
Figure 16:
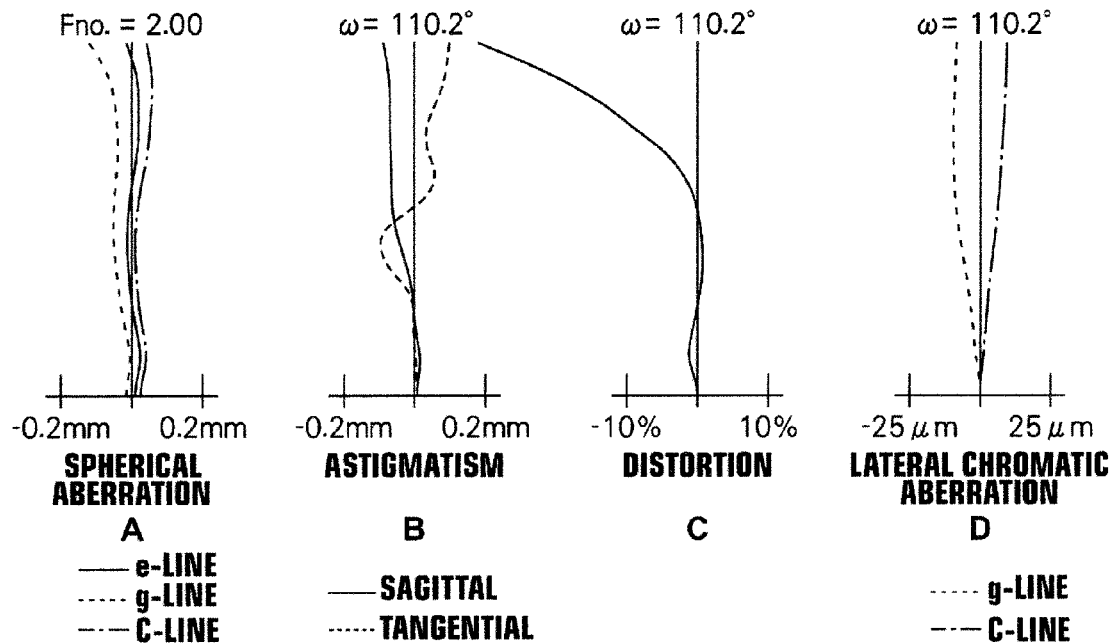
FIG. 16, Sections A through G illustrate aberration diagrams of the imaging lens in Example 8 of the present invention.
Figure 16:
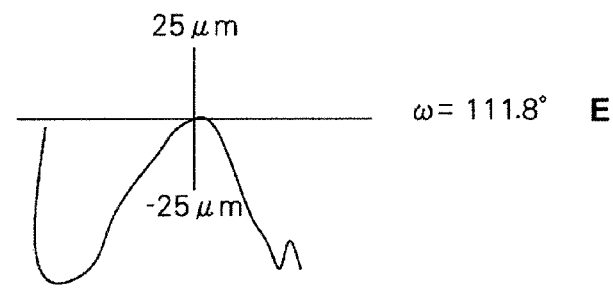
Figure 16:
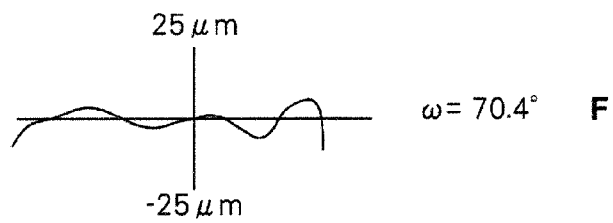
Figure 16:
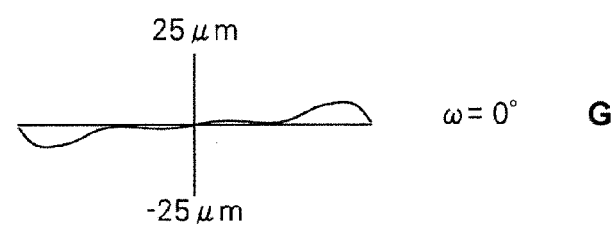

Similarly, FIG. 10, Sections A through G, FIG. 11, Sections A through G, FIG. 12, Sections A through G, FIG. 13, Sections A through G, FIG. 14, Sections A through G, FIG. 15, Sections A through G, and FIG. 16, Sections A through G illustrate aberration diagrams of a spherical aberration, astigmatism, distortion (a distortion aberration), a lateral chromatic aberration, and lateral aberrations of the imaging lenses of Examples 2 through 8, respectively.

The aberration diagram of distortion illustrates a shift amount from an ideal image height 2×f×tan(φ/2) by using focal length f of the entire system and half angle φ of view (variable, 0≤φ≤ω). Therefore, the value is minus in a peripheral portion. However, the distortion of the imaging lenses in Examples 1 through 8 is large positive values when the dis- Further, the imaging lens has excellent optical performance in which each aberration has been corrected in an excellent manner and resolution is high. These imaging lenses are appropriate for use in a surveillance camera, an in-vehicle camera for imaging an image on the front side, the lateral sides, the rear side or the like of a car, or the like.

Figure 17:
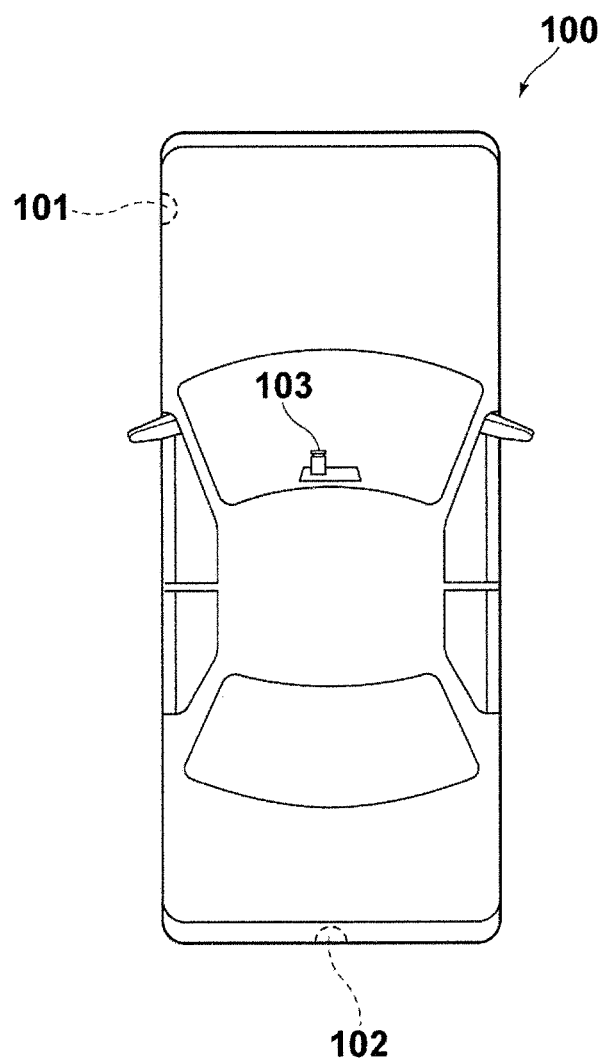
FIG. 17 is a diagram for explaining arrangement of an imaging apparatus for in-vehicle use according to an embodiment of the present invention.

FIG. 17 illustrates, as an example of usage, a manner of mounting an imaging apparatus including the imaging lens of the embodiment of the present invention in a car 100. In FIG. 17, the car 100 includes an exterior camera 101 for imaging a driver's blind spot on a side of a seat next to the driver, an exterior camera 102 for imaging a driver's blind spot on a rear side of the car 100, and an interior camera 103 for imaging the same range as the driver's visual field. The interior camera 103 is attached to the back side of a rearview mirror. The exterior camera 101, the exterior camera 102, and the interior camera 103 are imaging apparatuses according to an embodiment of the present invention, and they include an imaging lens according to an example of the present invention and an imaging device for converting an optical image formed by the imaging lens into electrical signals.

The imaging lenses according to the examples of the present invention have the aforementioned advantages. Therefore, the exterior cameras 101 and 102, and the interior camera 103 can be structured in small size and at low cost, and have wide angles of view. Further, they can obtain excellent images with high resolution.

So far, the present invention has been described by using embodiments and examples. However, the present invention is not limited to the aforementioned embodiments nor examples, and various modifications are possible. For example, values of a curvature radius, a distance between surfaces, a refractive index, an Abbe number and aspherical surface coefficients of each lens element are not limited to the values in the aforementioned examples of numerical values, but may be other values. Further, the material of the lens is not limited to the material used in each example of numerical values, but may be other materials.

In the embodiment of the imaging apparatus, a case in which the present invention is applied to an in-vehicle camera was described with reference to the drawing. However, the use of the present invention is not limited to this purpose. For example, the present invention may be applied to a camera for a mobile terminal, a surveillance camera, and the like.

What is claimed is:

1. An imaging lens substantially consisting of five lenses of:
   a first lens having a meniscus shape with its convex surface facing an object side and negative refractive power;
   a second lens having negative refractive power, and the image-side surface of which has a convex shape facing an image side in the vicinity of an optical axis;
   a third lens having positive refractive power;
   a stop;
   a fourth lens having positive refractive power; and
   a fifth lens having negative refractive power, which are in this order from the object side,
   wherein at least one of the surfaces of the first lens through the fifth lens is aspherical, and
   wherein the following conditional formula (2-1) is satisfied:

$$0.40 < d1\text{-}4/L \qquad (2\text{-}1),\text{ where}$$

L: a distance on the optical axis from an object-side surface of the first lens to an image plane (a distance between the fifth lens and the image plane is a distance in air), and
   d1-4: a distance on the optical axis from the object-side surface of the first lens to the image-side surface of the second lens.

2. The imaging lens, as defined in claim 1, wherein the following conditional formula (2-3) is satisfied:

$$0.40 < d1\text{-}4/L < 0.60 \qquad (2\text{-}3),\text{ where}$$

L: a distance on the optical axis from an object-side surface of the first lens to an image plane (a distance between the fifth lens and the image plane is a distance in air), and
   d1-4: a distance on the optical axis from the object-side surface of the first lens to the image-side surface of the second lens.

3. An imaging apparatus comprising:
   the imaging lens, as defined in claim 1, mounted thereon.

4. The imaging lens, as defined in claim 1, wherein the following conditional formula (7) is satisfied:

$$0.08 < d4\text{-}5/f \qquad (7),\text{ where}$$

d4-5: a distance on the optical axis from the image-side surface of the second lens to the object-side surface of the third lens, and
   f: a focal length of an entire system.

5. The imaging lens, as defined in claim 4, wherein the following conditional formula (7-1) is satisfied:

$$0.20 < d4\text{-}5/f < 0.60 \qquad (7\text{-}1),\text{ where}$$

d4-5: a distance on the optical axis from the image-side surface of the second lens to the object-side surface of the third lens, and
   f: a focal length of an entire system.

6. The imaging lens, as defined in claim 1, wherein the following conditional formula (8) is satisfied:

$$0.04 < d10/f \qquad (8),\text{ where}$$

d10: the thickness of the fifth lens on the optical axis.

7. The imaging lens, as defined in claim 6, wherein the following conditional formula (8-1) is satisfied:

$$0.20 < d10/f < 0.80 \qquad (8\text{-}1),\text{ where}$$

d10: the thickness of the fifth lens on the optical axis.

8. The imaging lens, as defined in claim 1, wherein the following conditional formula (9) is satisfied:

$$0.48 < f3/f \qquad (9),\text{ where}$$

f3: a focal length of the third lens.

9. The imaging lens, as defined in claim 8, wherein the following conditional formula (9-1) is satisfied:

$$2.0 < f3/f < 20.0 \qquad (9\text{-}1),\text{ where}$$

f3: a focal length of the third lens.

10. The imaging lens, as defined in claim 1, wherein the following conditional formula (10) is satisfied:

$$0.71 < Bf/f \qquad (10),\text{ where}$$

Bf: a back focus of an entire system.

11. The imaging lens, as defined in claim 10, wherein the following conditional formula (10-1) is satisfied:

$$1.5 < Bf/f < 3.0 \qquad (10\text{-}1),\text{ where}$$

Bf: a back focus of an entire system.

12. The imaging lens, as defined in claim 1, wherein the following conditional formula (11) is satisfied:

$$r10/f < -0.25 \qquad (11),\text{ where}$$

r10: a curvature radius of an object-side surface of the fifth lens in the vicinity of the optical axis.

13. The imaging lens, as defined in claim 12, wherein the following conditional formula (11-1) is satisfied:

$$-5.0 < r10/f < -0.50 \qquad (11\text{-}1),\text{ where}$$

r10: a curvature radius of an object-side surface of the fifth lens in the vicinity of the optical axis.

14. The imaging lens, as defined in claim 1, wherein the following conditional formula (12) is satisfied:

$$1.2 < L/f \qquad (12).$$

15. The imaging lens, as defined in claim 14, wherein the following conditional formula (12-1) is satisfied:

$$5.0 < L/f < 20.0 \qquad (12\text{-}1).$$

16. The imaging lens, as defined in claim 1, wherein the following conditional formula (13) is satisfied:

$$(r8+r9)/(r8-r9) < 2.9 \qquad (13),\text{ where}$$

r8: a curvature radius of an object-side surface of the fourth lens in the vicinity of the optical axis, and
    r9: a curvature radius of an image-side surface of the fourth lens in the vicinity of the optical axis.

17. The imaging lens, as defined in claim 16, wherein the following conditional formula (13-1) is satisfied:

$$(r8+r9)/(r8-r9) < 2.0 \qquad (13\text{-}1),\text{ where}$$

r8: a curvature radius of an object-side surface of the fourth lens in the vicinity of the optical axis, and
    r9: a curvature radius of an image-side surface of the fourth lens in the vicinity of the optical axis.

18. An imaging lens substantially consisting of five lenses of:
    a first lens having a meniscus shape with its convex surface facing an object side and negative refractive power;
    a second lens having negative refractive power;
    a third lens having positive refractive power;
    a stop;
    a fourth lens having positive refractive power; and a fifth lens having negative refractive power, which are in this order from the object side, wherein at least one of the surfaces of the first lens through the fifth lens is aspherical, and wherein the following conditional formula (2-2) is satisfied:

$$0.40 < d1\text{-}4/L \quad (2\text{-}2),$$ where

L: a distance on the optical axis from an object-side surface of the first lens to an image plane (a distance between the fifth lens and the image plane is a distance in air), and d1-4: a distance on the optical axis from the object-side surface of the first lens to the image-side surface of the second lens.

19. The imaging lens, as defined in claim 18, wherein the following conditional formula (2-3) is satisfied:

$$0.40 < d1\text{-}4/L < 0.60 \quad (2\text{-}3),$$ where

L: a distance on the optical axis from an object-side surface of the first lens to an image plane (a distance between the fifth lens and the image plane is a distance in air), and d1-4: a distance on the optical axis from the object-side surface of the first lens to the image-side surface of the second lens.

\* \* \* \* \*